United States Patent [19]

Brewer

[11] Patent Number: 4,884,244
[45] Date of Patent: Nov. 28, 1989

[54] METHOD OF ADDRESSING A COMPUTER MEMORY

[75] Inventor: Tony M. Brewer, Raleigh, N.C.

[73] Assignee: Data General Corporation, Westboro, Mass.

[21] Appl. No.: 695,335

[22] Filed: Jan. 28, 1985

[51] Int. Cl.⁴ .............................................. G11C 8/00
[52] U.S. Cl. .................................... 365/240; 365/219
[58] Field of Search ................................... 365/73–77, 365/83, 219, 221, 240

[56] References Cited

U.S. PATENT DOCUMENTS

| | | | |
|---|---|---|---|
| 2,992,416 | 7/1961 | Sims, Jr. | 365/240 |
| 3,972,034 | 7/1976 | Derickson | 365/219 |
| 4,066,880 | 1/1978 | Salley | 365/200 |
| 4,616,343 | 10/1986 | Ogawa | 365/219 |

OTHER PUBLICATIONS

EDN-vol. 26, No. 1; Jan 27, 1981; pp. 198 & 200, copy in 36.5-219.

Primary Examiner—James W. Moffitt

[57] ABSTRACT

A microcomputer is disclosed having a LIFO memory employed as a stack, and a shift register employed as a stack pointer for controlling access to the stack. There is no need to decode the contents of a stack pointer. Thus, high speed of operation is possible.

4 Claims, 38 Drawing Sheets

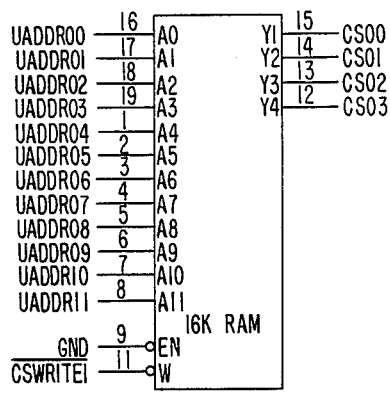
FIG.12A
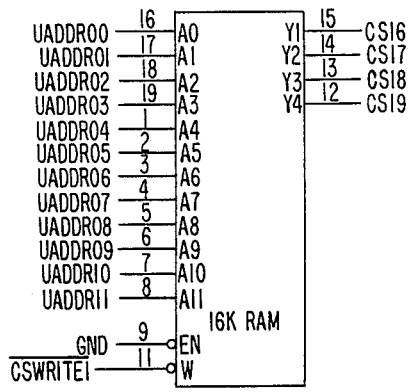
FIG.12E
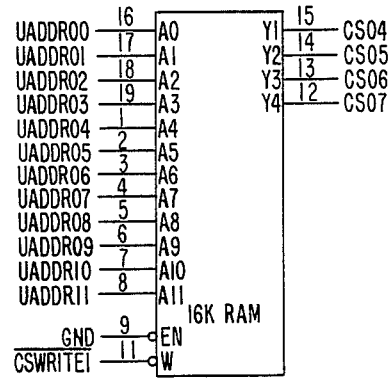
FIG.12B
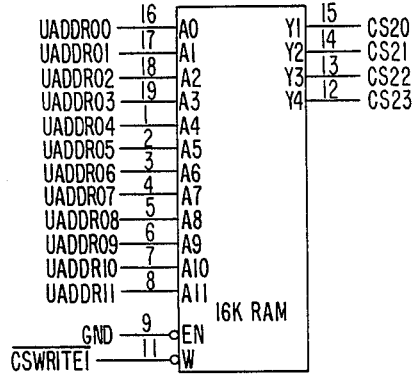
FIG.12F
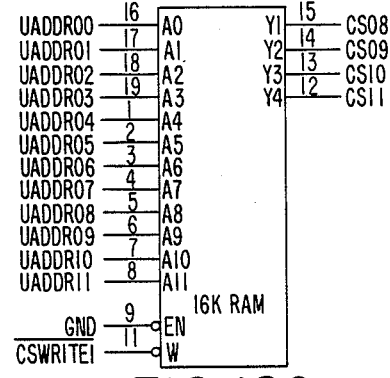
FIG.12C
FIG.12G
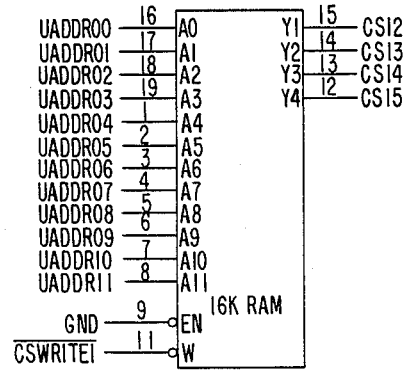
FIG.12D
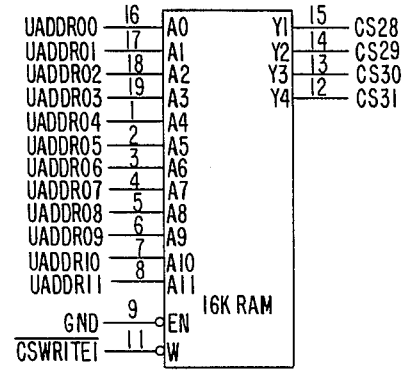
FIG.12H

LOCATION 0
2001

LOCATION 1
2002

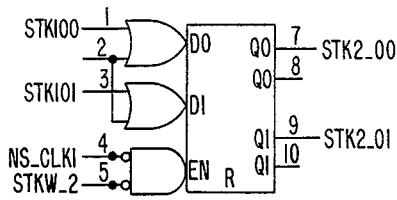
*FIG. 20P*
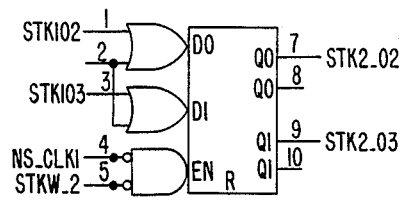
*FIG. 20Q*
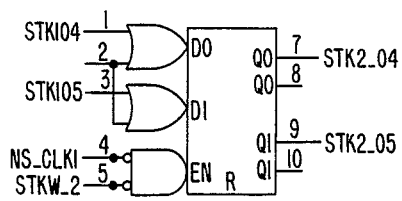
*FIG. 20R*
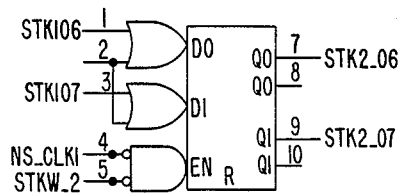
*FIG. 20S*
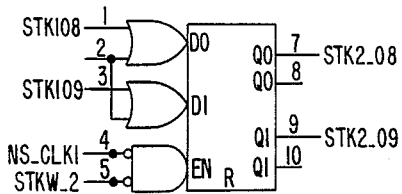
*FIG. 20T*
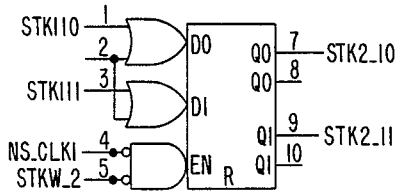
LOCATION 2
2003  *FIG. 20U*
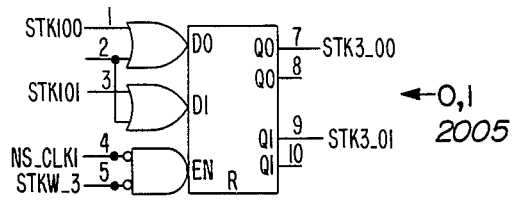
←0,1
2005
*FIG. 20V*
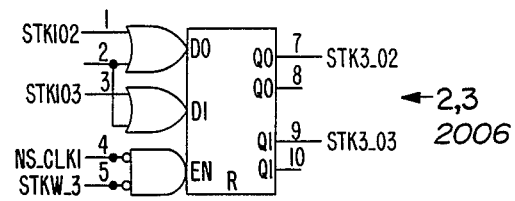
←2,3
2006
*FIG. 20W*
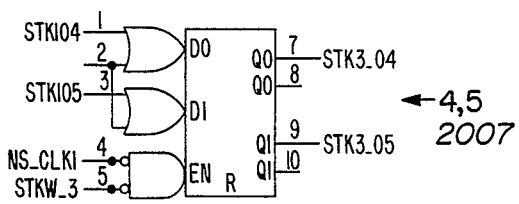
←4,5
2007
*FIG. 20X*
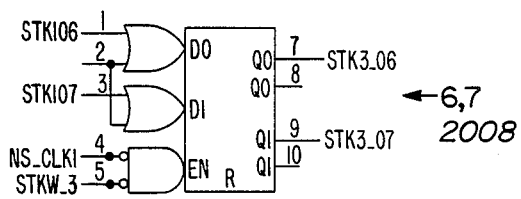
←6,7
2008
*FIG. 20Y*
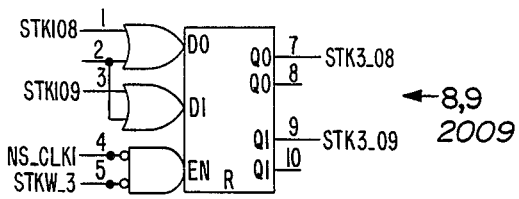
←8,9
2009
*FIG. 20Z*
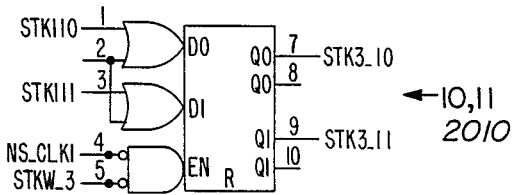
←10,11
2010
LOCATION 3
2004  *FIG. 20AA*

METHOD OF ADDRESSING A COMPUTER MEMORY

CROSS-REFERENCE TO RELATED APPLICATIONS

This application is related to the application entitled "A Method of Enhancing the Speed of a Stored-Program Digital Computer", filed as of even date herewith.

BACKGROUND OF THE INVENTION

1. Field of the Invention

This invention relates to digital computers, particularly to digital computers having memory devices for storing information in individually adressable locations, and more particularly to methods of accessing particular locations within such memory devices.

2. Description of the Prior Art

A stored-program computer typically includes a device for storing the memory address, or the equivalent thereof, of the next instruction to be executed by the central processing unit; this device usually takes the form of a register, and is typically called the "program counter", or "PC". The program counter typically is loaded with the starting address of a desired sequence of instructions, and is incremented from that point to "point to" successive addresses of the subsequent instructions.

The next instruction to be executed is typically the next sequential instruction in the memory device. However, some of the instructions may be "branch" or "jump" instructions, which result in next executing an instruction other than the next sequential instruction. Such other instruction is known as the "target" instruction of a branch.

A "conditional branch" instruction specifies that a target instruction (other than the next sequential instruction) will be executed if a certain specified condition (such as a machine-state condition or a variable being equal to a certain value) is met. If the specified condition is not met, the next sequential instruction is executed.

In a rudimentary digital computer, an instruction to be executed is fetched from the memory location indicated by the program counter. The program counter is then incremented to point to the next sequential instructions to be fetched. If execution of the current instruction indicates that branching is to occur, the program counter contents are overwritten by the branch address specified by the current branch instruction. Using the program counter to indicate the address in memory of the next instruction, the correct next instruction is then fetched.

Another situation in which instructions are executed in an order other than that in which they are arranged in memory occurs in conjunction with subroutine calls and returns. Instruction subsequences that may be needed repeatedly may be written as "subroutines". Then, when it is desired to execute one such subsequence, a "CALL" instruction appears in the instruction sequence; the call instruction specifies the starting address of the subroutine as the instruction to be executed next. The last instruction in the subroutine is a "RETURN" instruction, which indicates that the subroutine has run to completion and that the sequence which called the subroutine is now to be resumed at the instruction immediately following the CALL instruction (the instruction which invoked the subroutine).

To facilitate call and return instructions, computers typically employ a LIFO (last-in, first-out) memory, usually called a "stack", to store return addresses (i.e., the addresses of instructions following call instructions, which are the addresses at which execution is to be resumed after executing return instructions). While executing a call instruction, the program counter contains the address of the next sequential instruction, having been incremented as mentioned above after being used to fetch the call instruction. The program counter contents are then usually placed in the next available location in the stack (often referred to as the "top of the stack"). The program counter is loaded with the address specified in the call instruction as the starting address of the subroutine, and execution of the subroutine proceeds from there. When the return instruction is encountered, the program counter is loaded with the address of the instruction at which execution is to be resumed, i.e. the address of the instruction following the call instruction which invoked the subroutine. This address is found on top of the stack, for it was placed there as part of the execution of the call instruction.

Associated with the stack is a "stack pointer", typically a multibit register with provision for incrementing and decrementing by one. A register containing the address of some item is commonly said to "point to" that item. The stack pointer initially points to the first location in the stack, is incremented by one whenever anything is placed on the stack, and is decremented by one whenever anything is retrieved from the stack. Thus, the stack pointer always points to the next available location in the stack. This scheme allows for "nested subroutine calls", i.e., for a subroutine to call another subroutine. If, for example, an instruction sequence has called subroutine A which has called subroutine B, then when subroutine B encounters a return instruction, the address to which it is to return in subroutine A is retrieved from the top of the stack, and the stack pointer is decremented by one; when subroutine A encounters a return instruction, the address to which it is to return in the main sequence is retrieved from the "new" top of the stack, the locations to which the stack pointer has been decremented to point. Calls may be nested over as many levels as there are available locations in the stack.

The stack portions of prior art machines typically hold the address of the next memory location to be accessed in the stack. For each memory access, the contents of the stack pointer must be decoded (usually accomplished by gating logic) to select the corresponding memory location. Additional gating must be employed to determine whether the stack has overflowed (i.e., an attempt was made to exceed its capacity) or underflowed (i.e., an attempt was made to retrieve nonexistent contents).

Throughout this document, the term "branching" will be used to denote the situation that exists when the next instruction to be executed is other than the next sequential one, regardless of whether this is because of a branch instruction, a call instruction, or a return instruction.

Efforts to speed up the operation of digital computers have included such improvements as "instruction prefetching", wherein the next instruction to be executed is fetched from memory while a current instruction is still executing. Thus, execution of an instruction can commence immediately upon the completion of the execution of the previous instruction and the central processing unit is not delayed while memory accesses, bus transfers, and the like take place.

A problem in extracting the full benefit from instruction prefetching occurs in conjunction with conditional branch instructions. It usually cannot be known whether a conditional branch is to take place until some point near the end of execution of the conditional branch instruction, by which time the next sequential instruction (not the target instruction) should already have been fetched. A delay then ensues while fetching the target instruction. Various approaches have been tried to limit this delay in fetching the target instruction, such as mechanisms for predicting the outcome of a conditional branch (see, for example, U.S. Pat. No. 4,430,706 issued to Sand), or assuming that conditional branches will always be taken (or never be taken), and requiring the programmer to construct his programs in as close conformance as possible to the assumption. (For example, in coding a loop that is to be executed twenty times, the programmer can employ an exit branch that is not taken twenty times and then taken once or alternatively a return branch that is taken twenty times and then not taken once.)

Despite these various approaches, the prediction or assumption is not always correct—the wrong instruction has been prefetched, and a delay ensues while fetching the correct next instruction.

SUMMARY OF THE INVENTION

This invention provides a shift register for addressing a last-in first-out (LIFO) memory. Each stage of the shift register is associated with a corresponding location in the LIFO memory. The output of each stage of the shift register is used as the address selection line for its corresponding location in the LIFO memory, without any decoding. Additional stages in the shift register are used to indicate that the LIFO memory has overflowed or underflowed.

It is thus an object of the present invention to provide improved digital data systems.

It is another object of the present invention to provide improved means for addressing memory devices within digital data systems.

It is a further object of the present invention to provide fast-acting addressing means for memory devices of digital data systems.

Other objects and advantages of the present invention will be understood by those of ordinary skill in the art, after referring to the description of the preferred embodiments and the appended drawings.

FIGS. 5A, 5B, 5C, 6A, 6B, and 6C depict the circuitry which comprises the branch address multiplexer of the present invention.

Figure 7A:
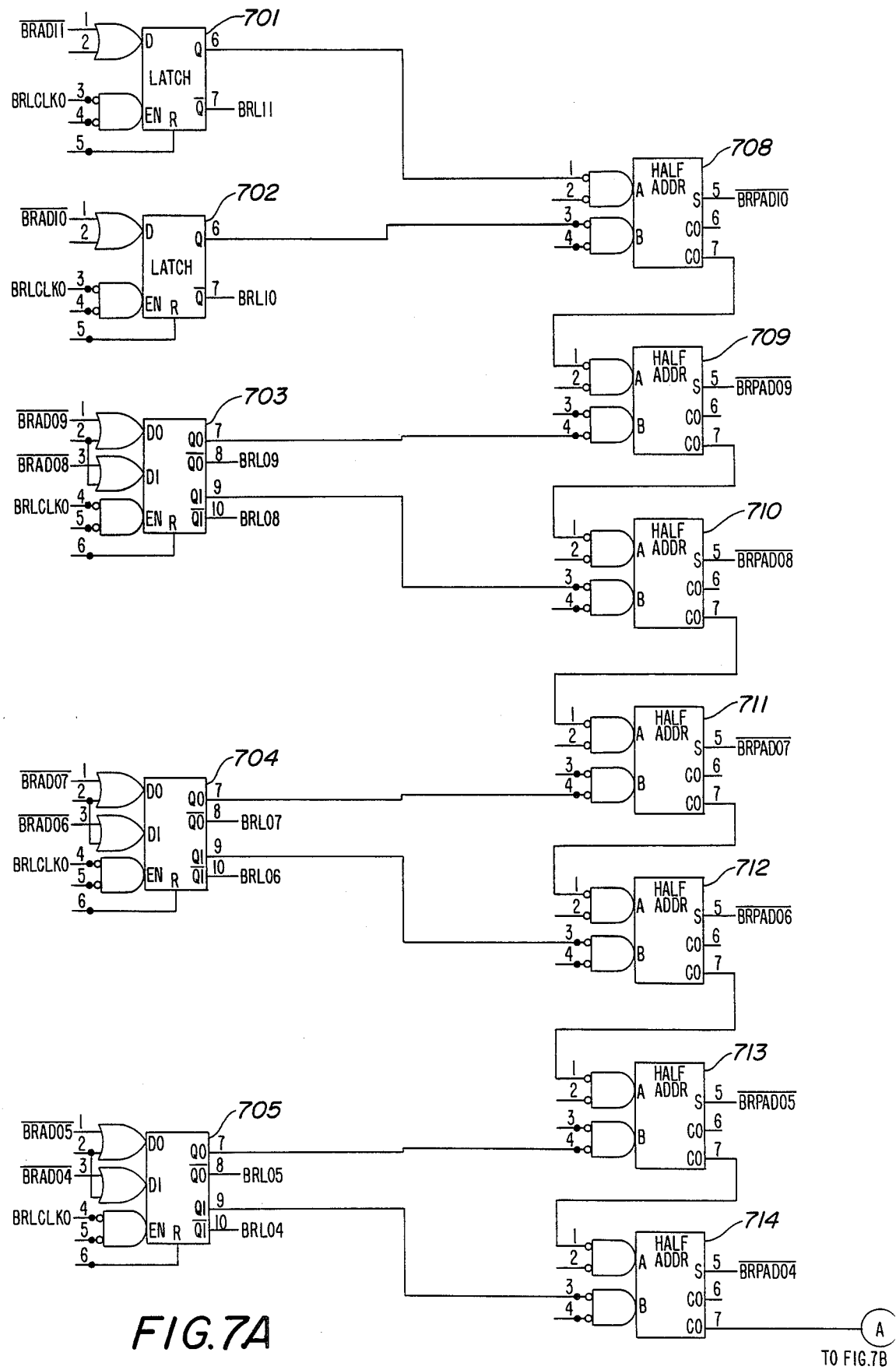
Figure 7B:
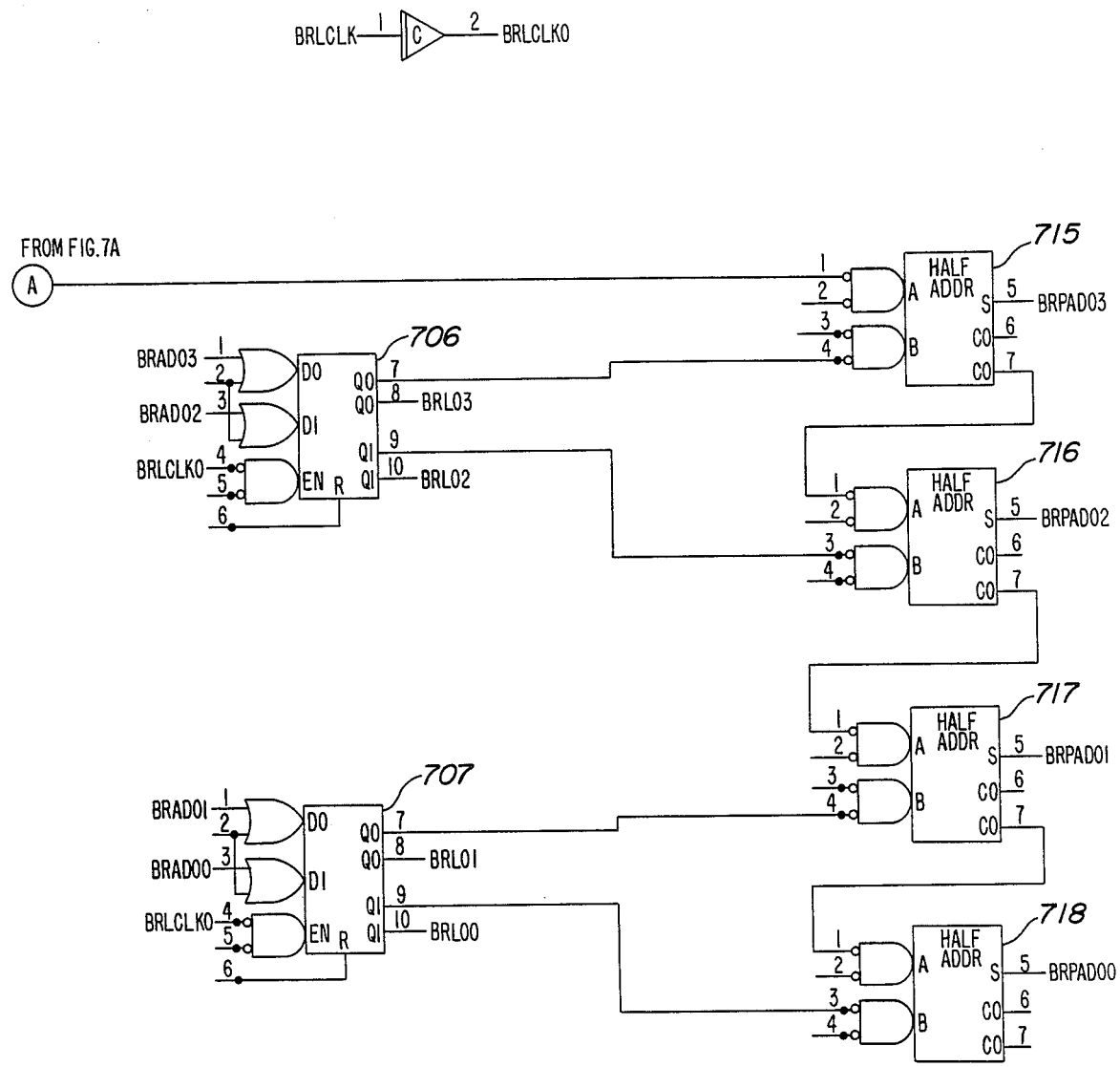

FIGS. 7A and 7B show the circuitry which comprises the branch latch and branch address incrementing means of the present invention.

Figure 8A:
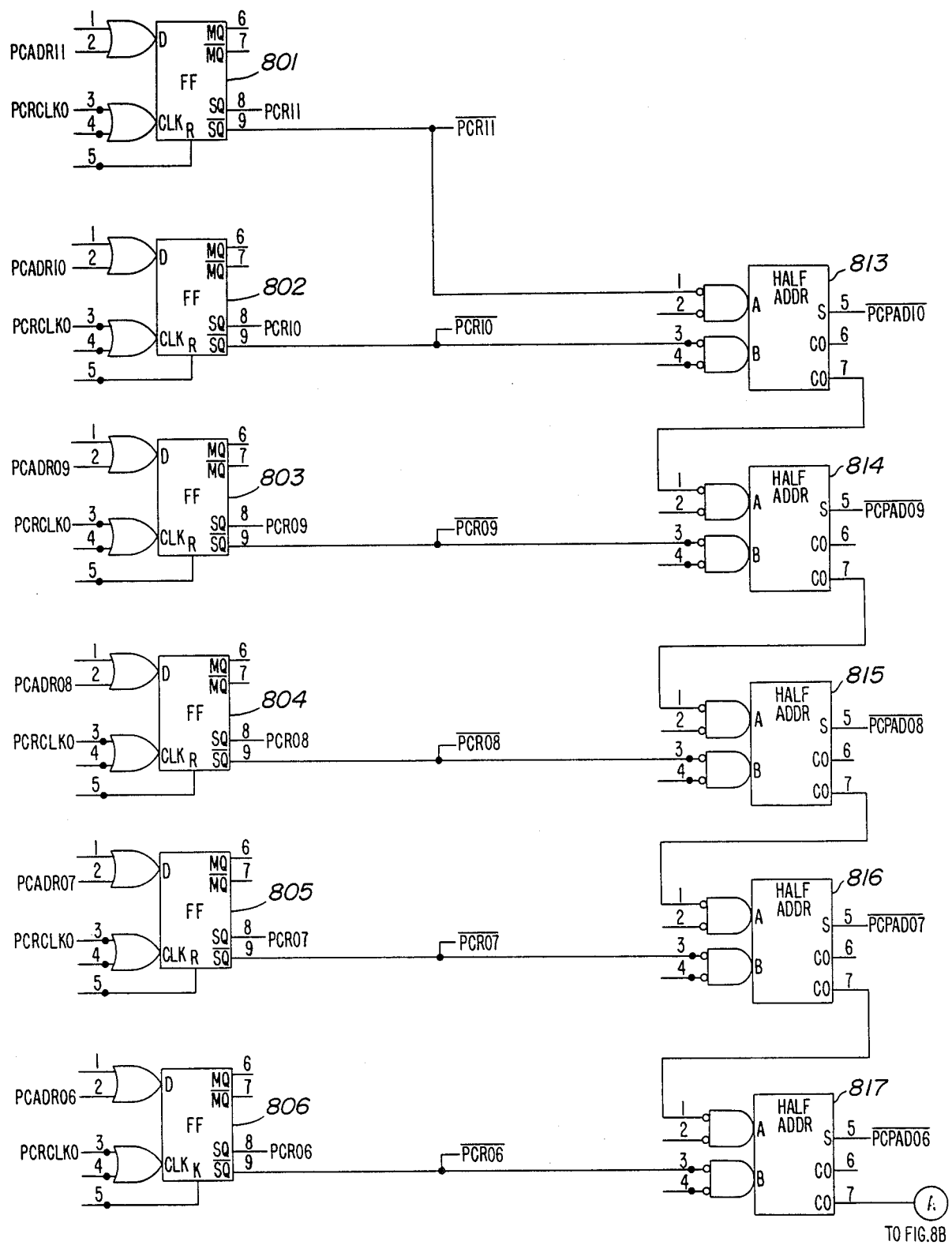
Figure 8B:
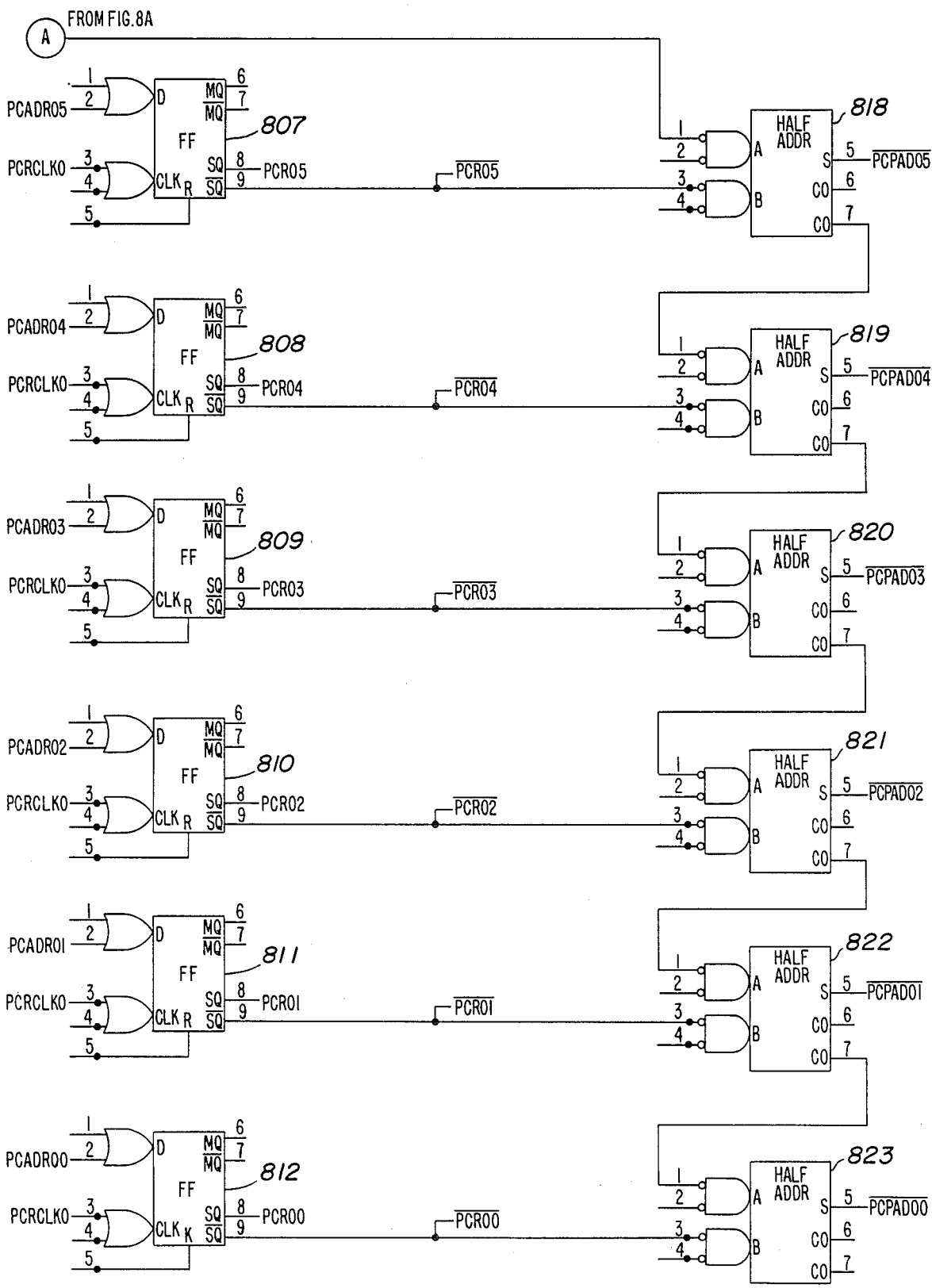

FIGS. 8A and 8B show the circuitry comprising the program counter and program counter incrementing means of the present invention.

Figure 9A:
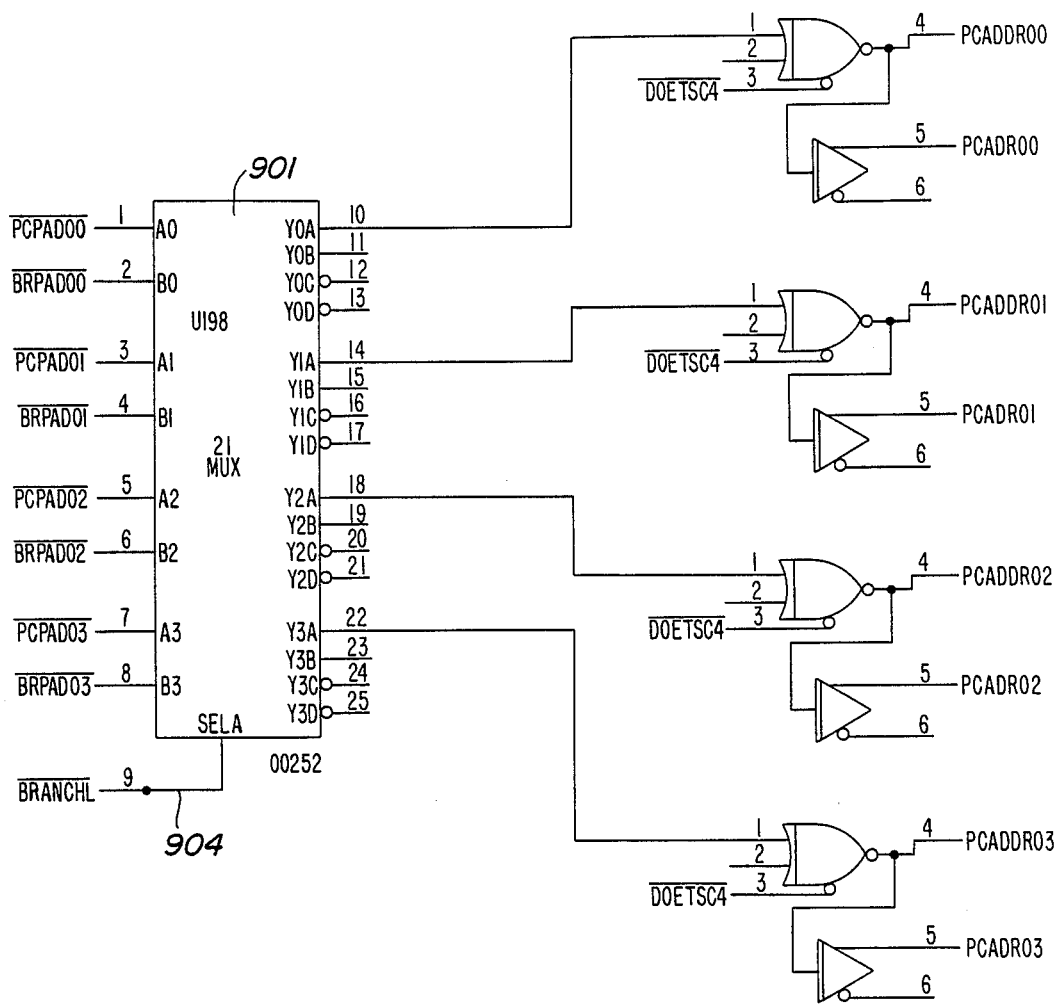
Figure 9B:
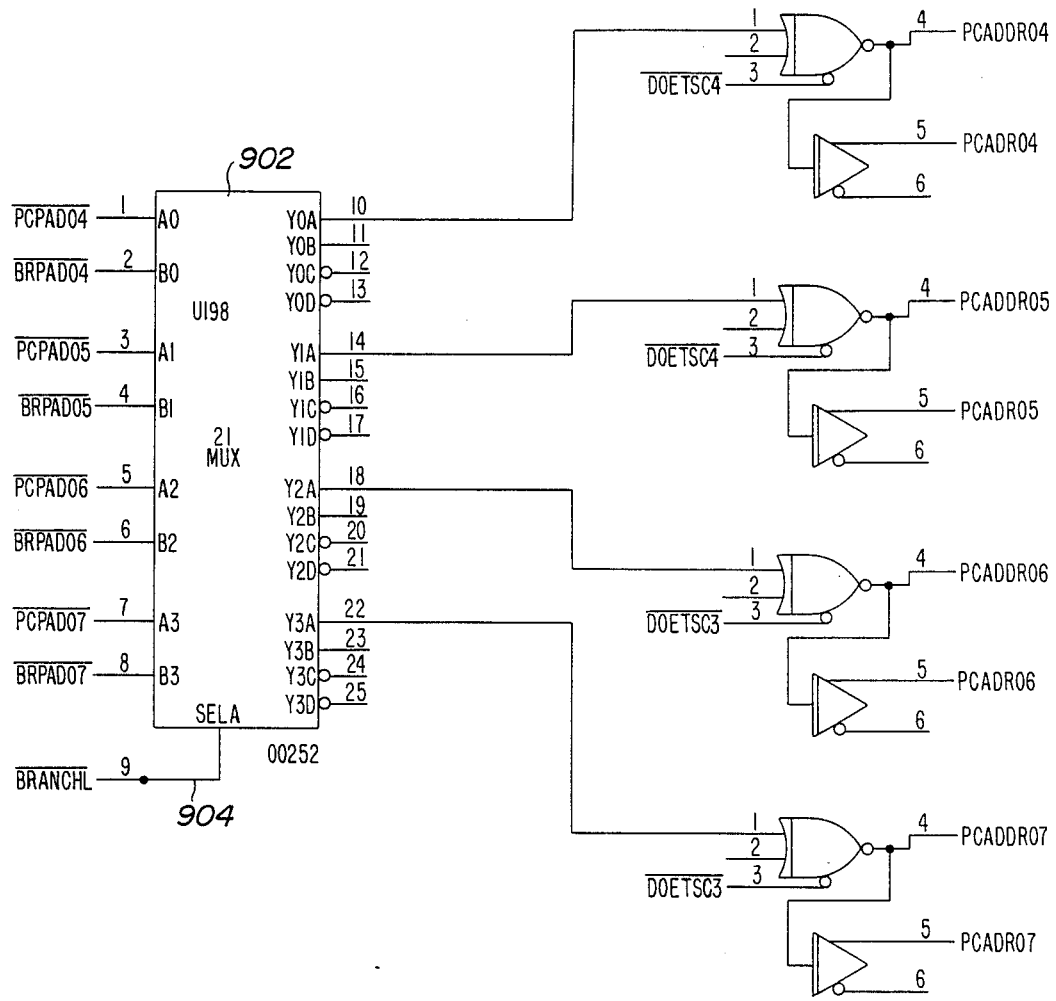
Figure 9C:
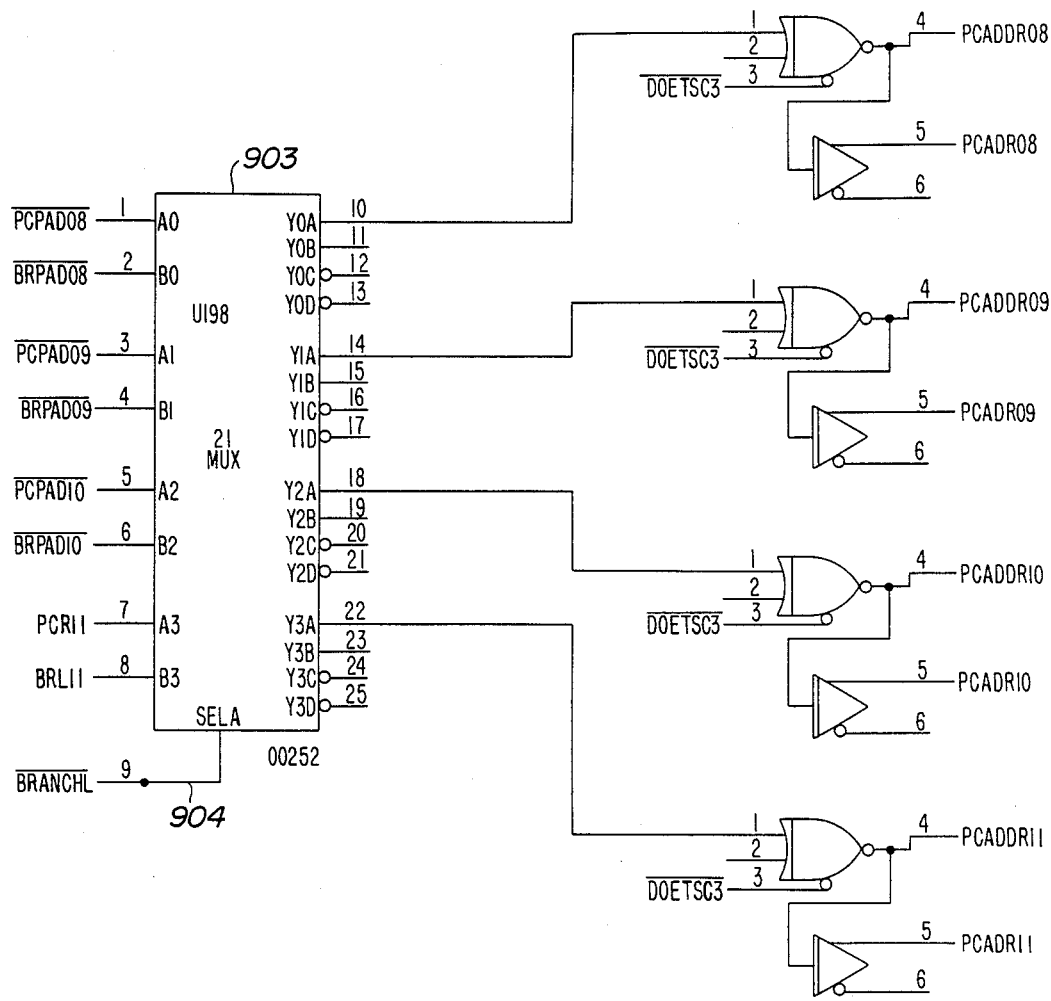
Figure 10A:
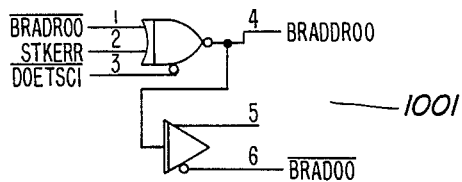
Figure 10G:
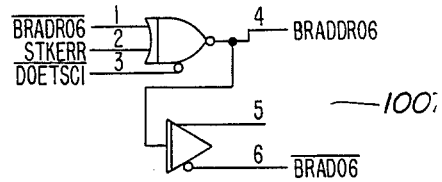
Figure 10B:
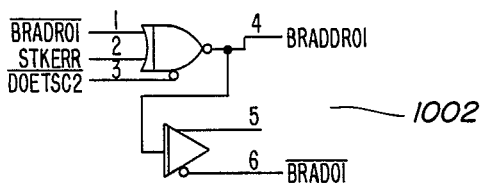
Figure 10H:
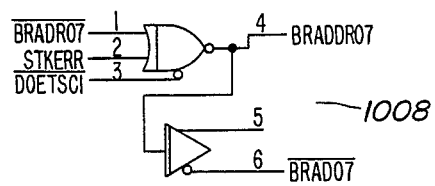
Figure 10C:
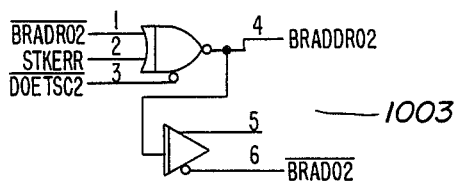
Figure 10I:
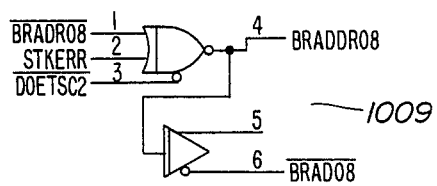
Figure 10D:
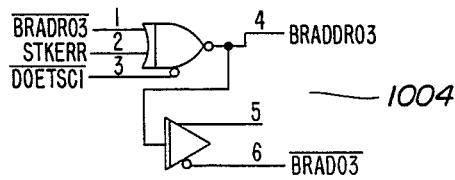
Figure 10J:
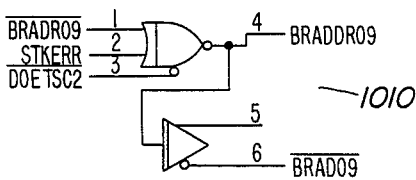
Figure 10E:
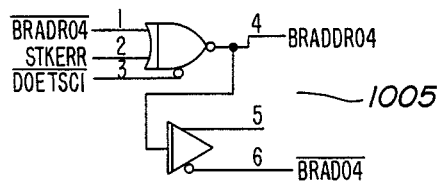
Figure 10K:
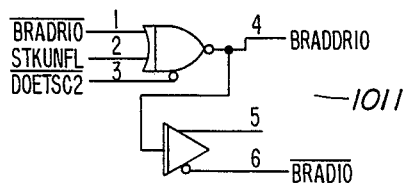
Figure 10F:
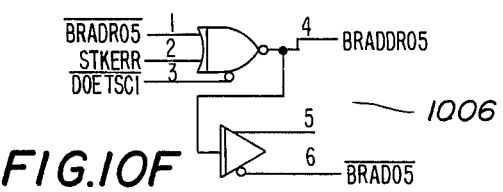
Figure 10L:
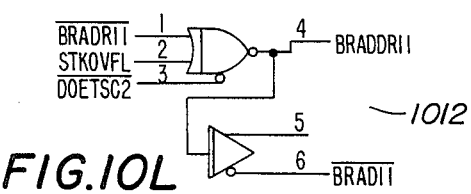

FIGS. 9A, 9B, and 9C show circuitry comprising the program counter input multiplexor of the present invention.

FIG. 10 shows circuitry for branch address forwarding of the present invention.

Figure 11A:
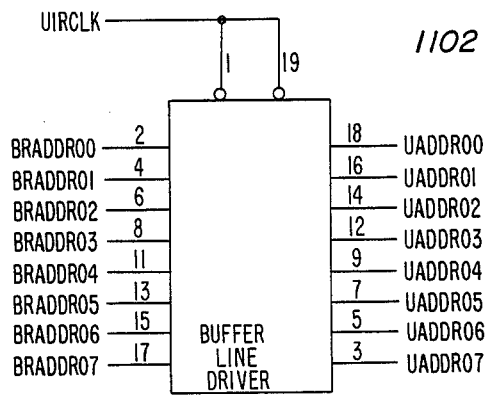
Figure 11B:
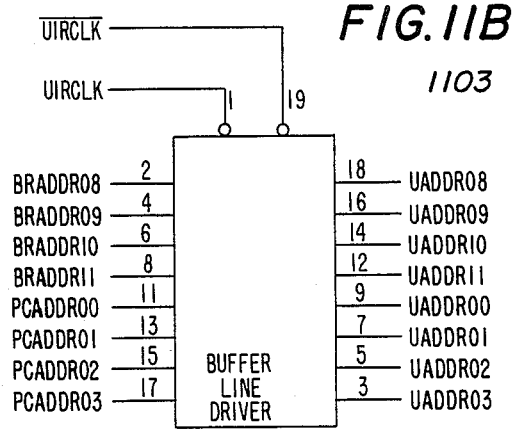
Figure 11C:
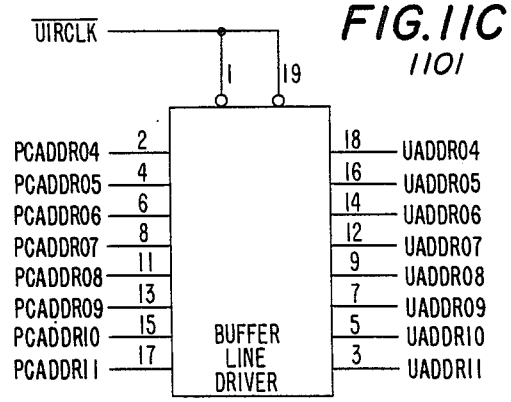

FIG. 11 depicts the control store address input multiplexor of the present invention.

Figure 12I:
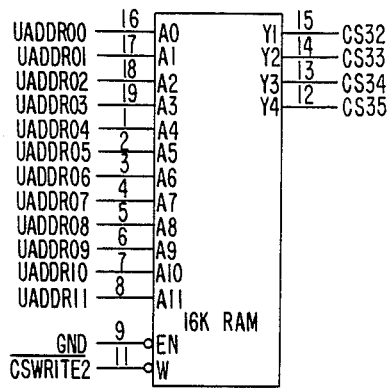
Figure 12M:
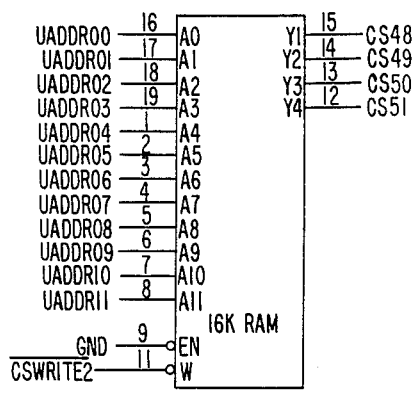
Figure 12J:
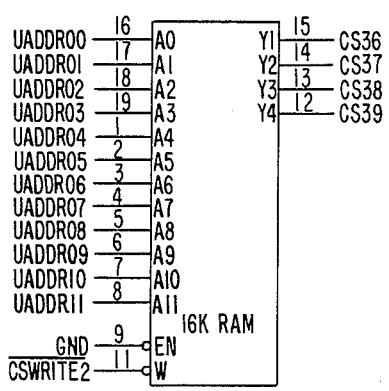
Figure 12N:
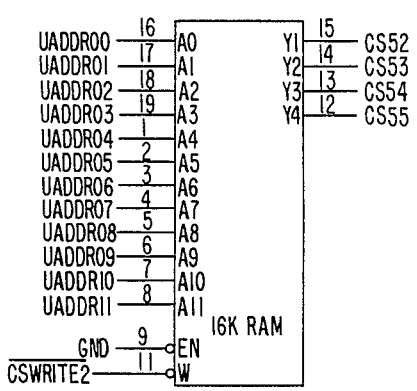
Figure 12K:
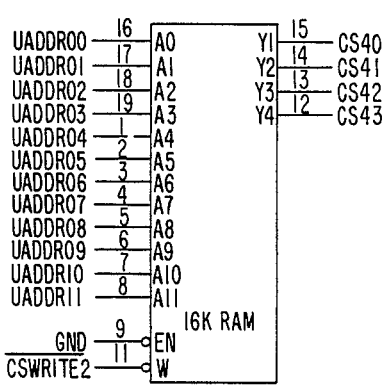
Figure 12O:
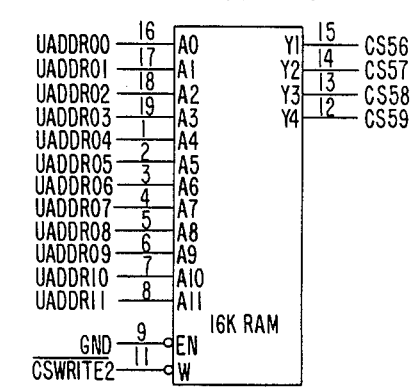
Figure 12L:
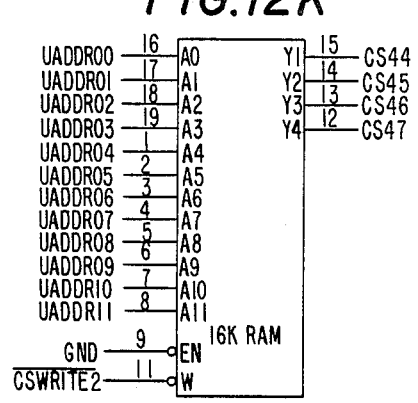
Figure 12P:
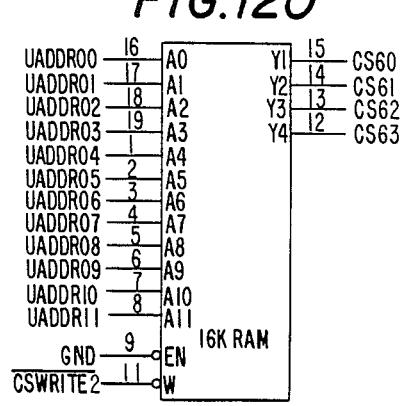
Figure 12Q:
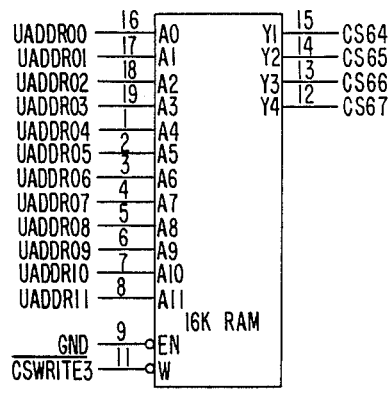
Figure 12U:
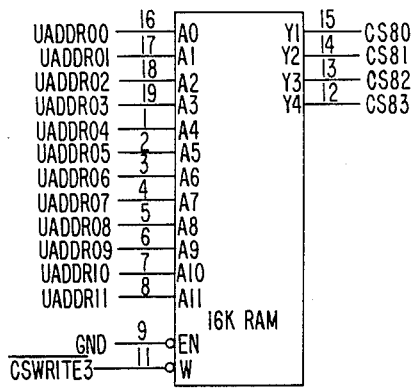
Figure 12R:
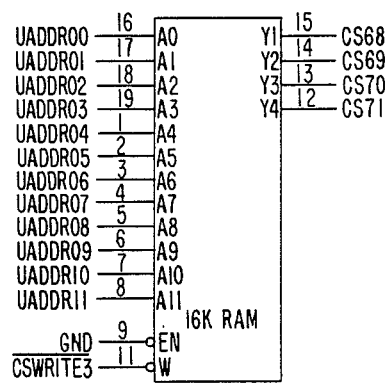
Figure 12V:
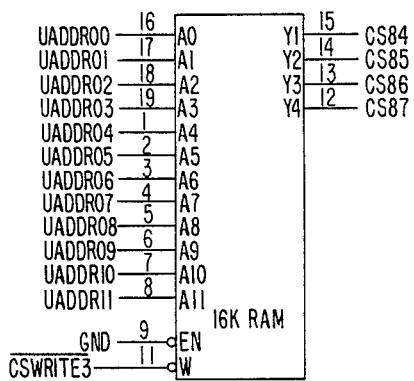
Figure 12S:
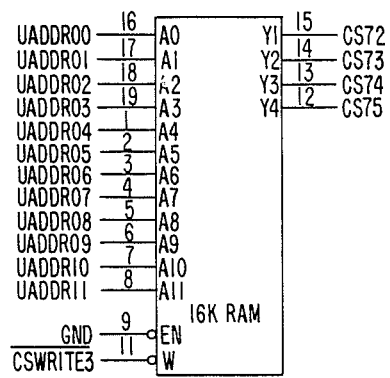
Figure 12W:
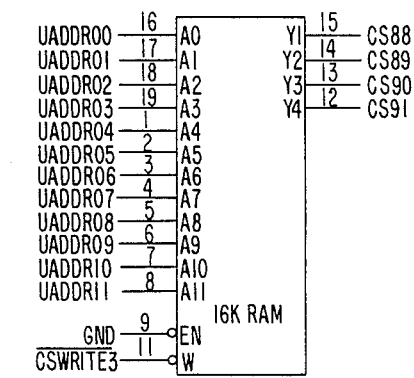
Figure 12T:
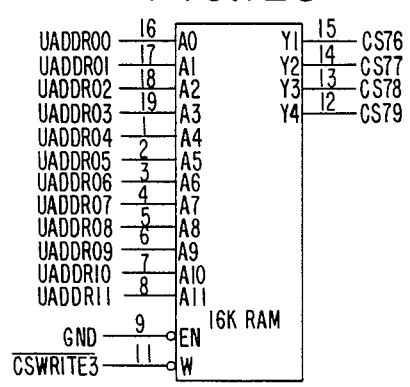
Figure 12X:
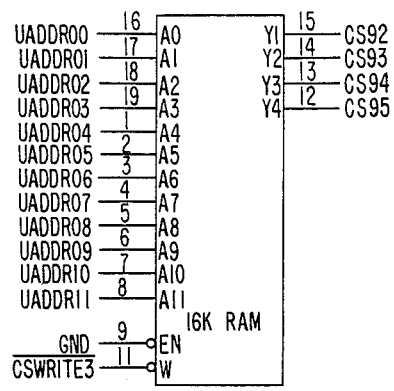
Figure 12Y:
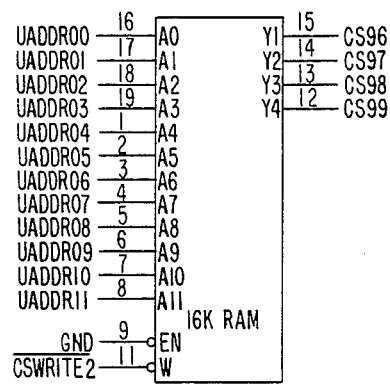

FIGS. 12A, 12B, and 12C depict the microinstruction control store of the present invention.

Figure 13A:
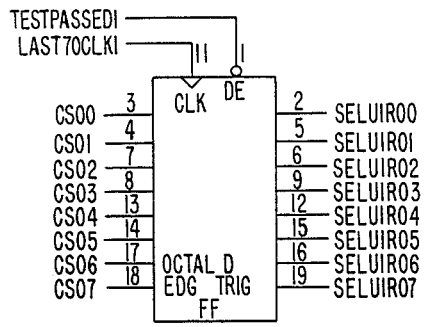
Figure 13E:
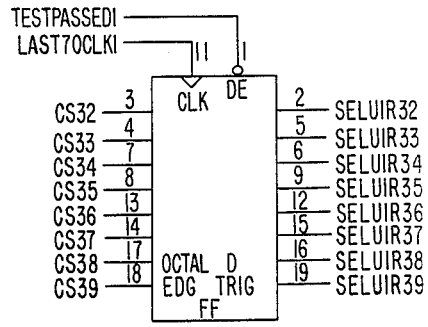
Figure 13B:
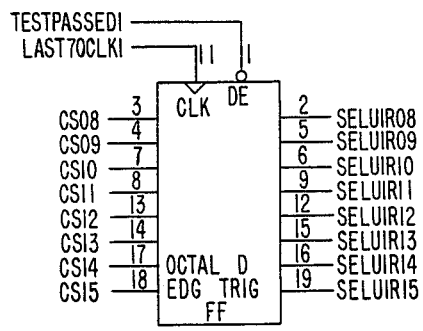
Figure 13F:
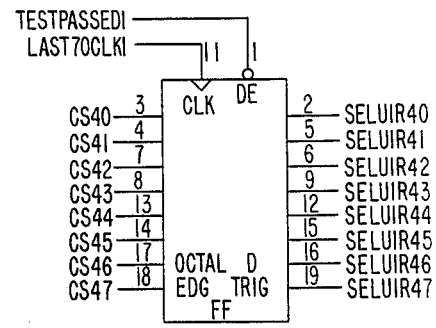
Figure 13C:
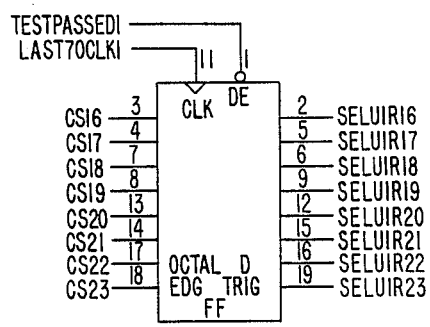
Figure 13G:
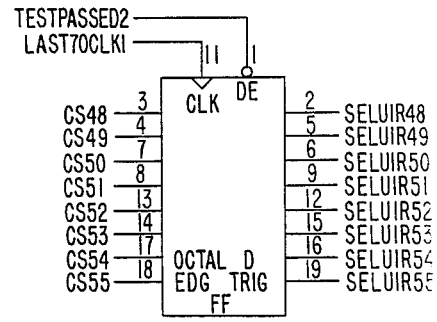
Figure 13D:
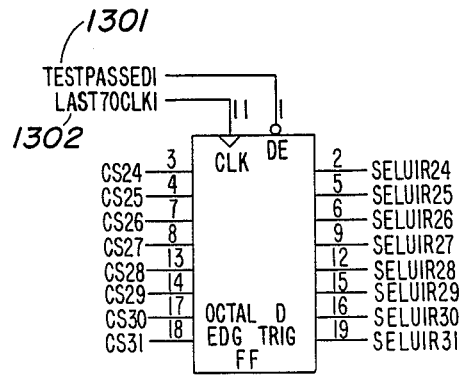
Figure 13H:
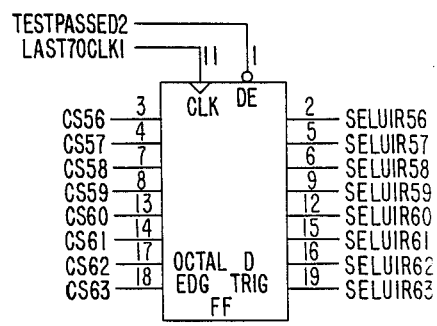
Figure 13I:
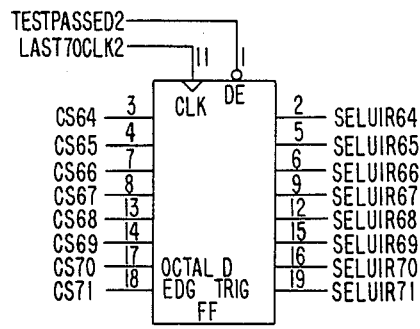
Figure 13J:
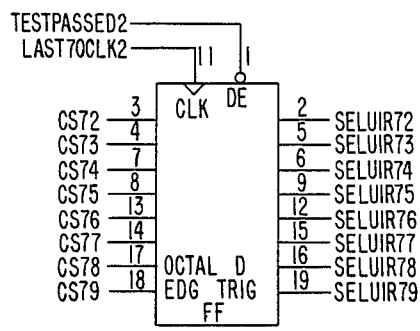
Figure 13K:
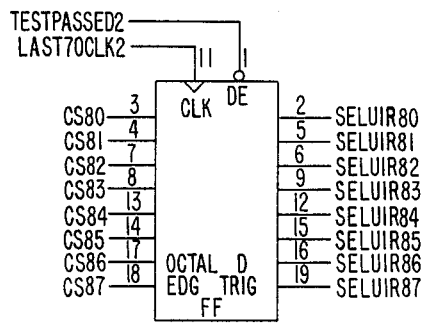
Figure 13L:
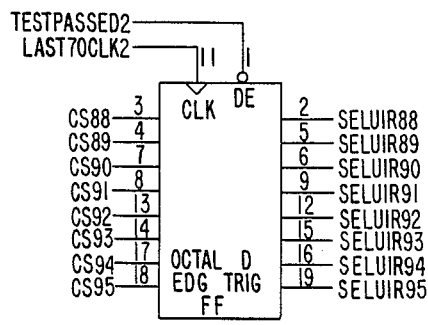

FIGS. 13A and 13B depict the microinstruction prefetch register of the present invention.

Figure 14A:
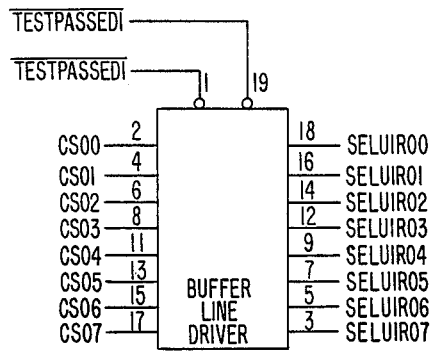
Figure 14E:
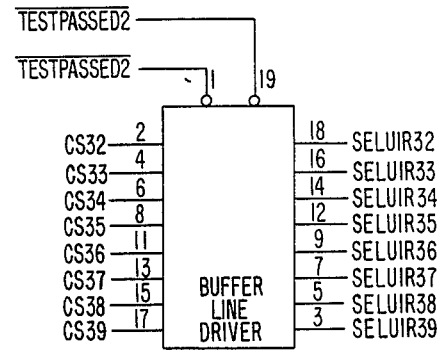
Figure 14B:
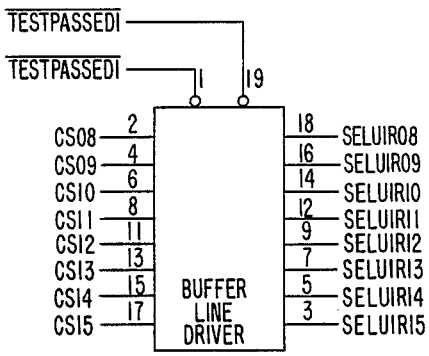
Figure 14F:
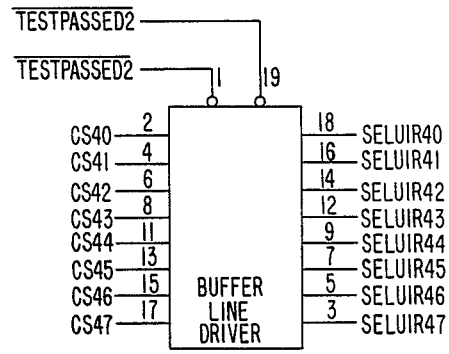
Figure 14C:
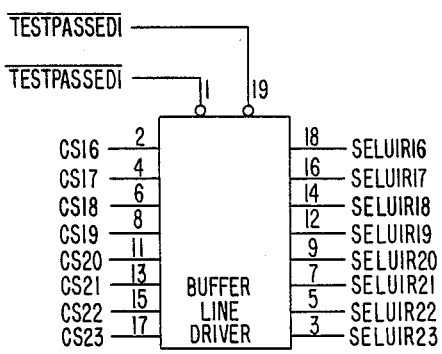
Figure 14G:
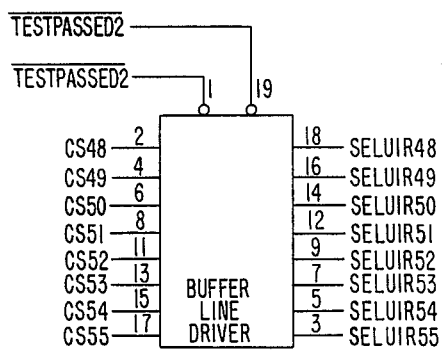
Figure 14D:
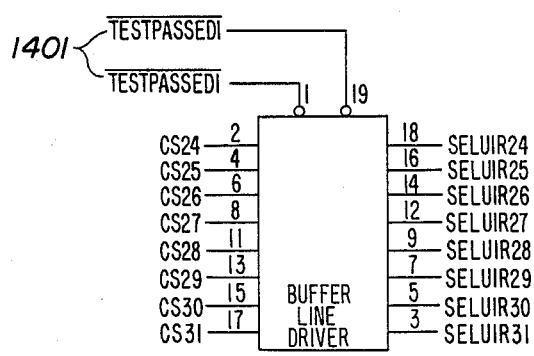
Figure 14H:
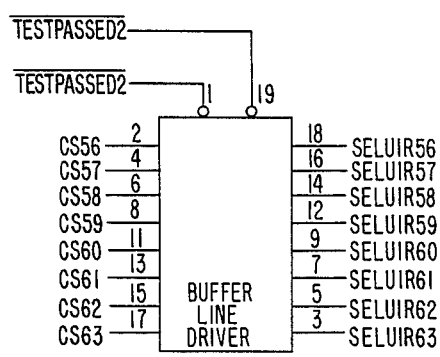
Figure 14I:
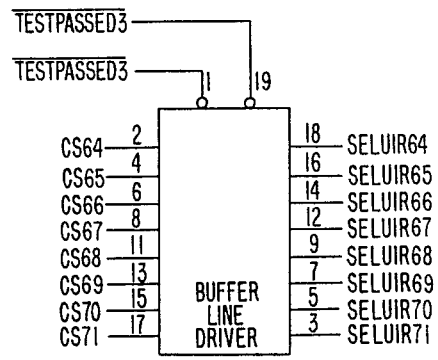
Figure 14J:
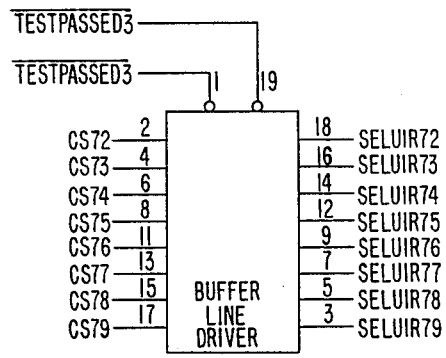
Figure 14K:
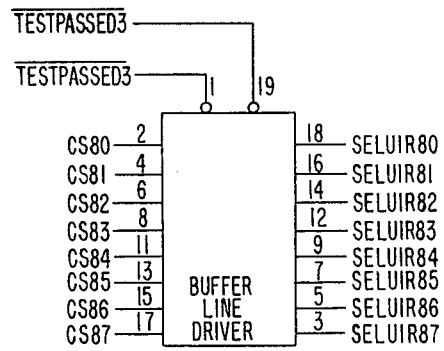
Figure 14L:
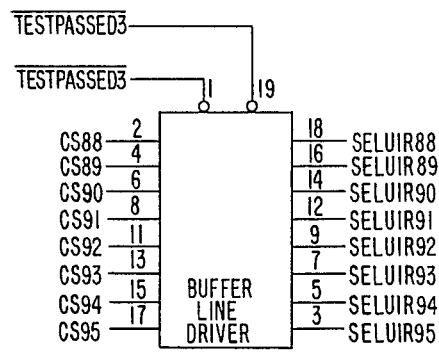

FIGS. 14A and 14B depict the microinstruction prefetch buffer of the present invention.

Figure 15A:
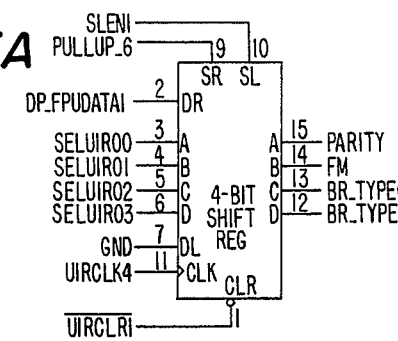
Figure 15F:
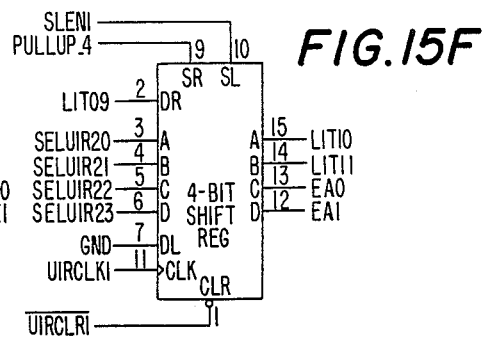
Figure 15B:
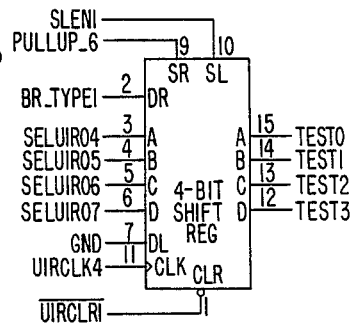
Figure 15G:
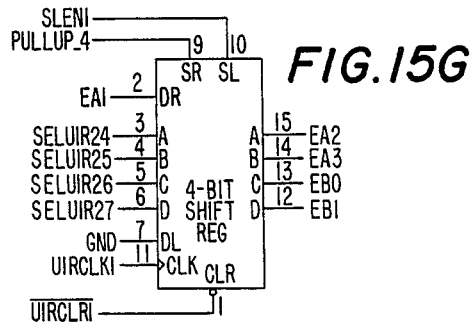
Figure 15C:
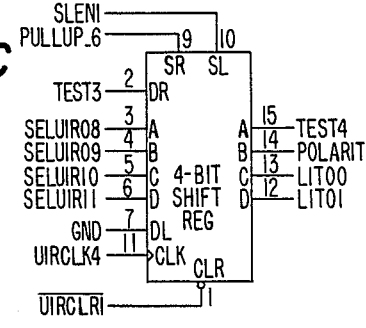
Figure 15H:
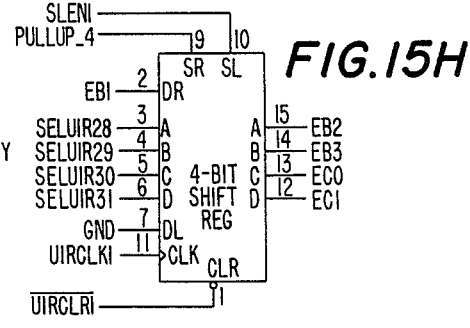
Figure 15D:
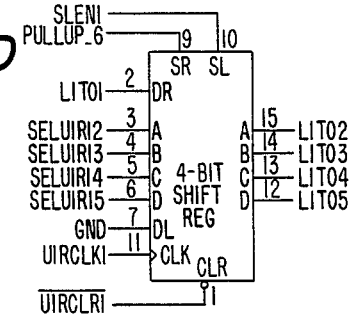
Figure 15I:
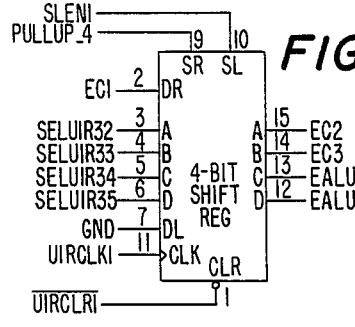
Figure 15E:
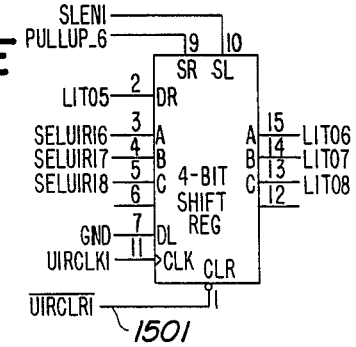
Figure 15J:
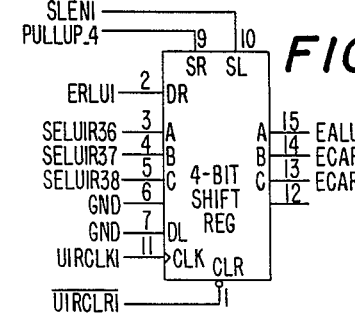
Figure 15K:
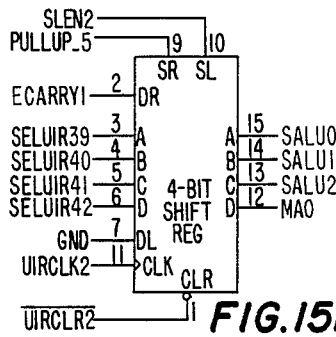
Figure 15P:
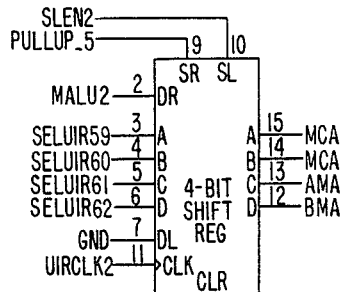
Figure 15U:
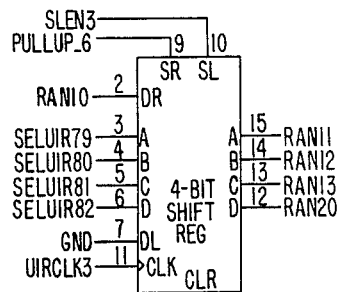
Figure 15L:
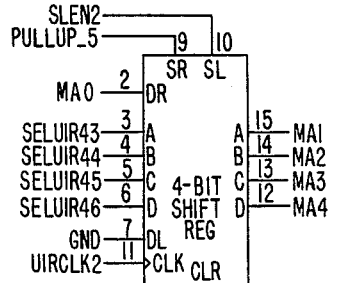
Figure 15Q:
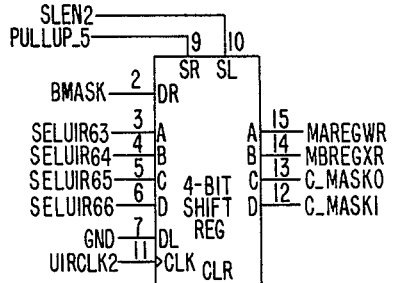
Figure 15V:
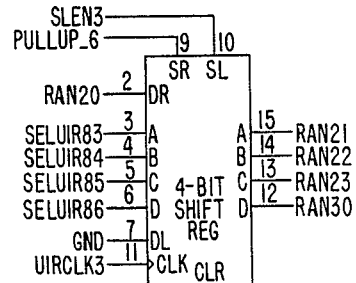
Figure 15M:
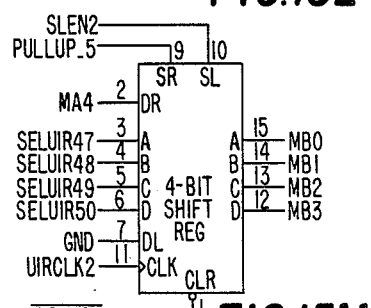
Figure 15R:
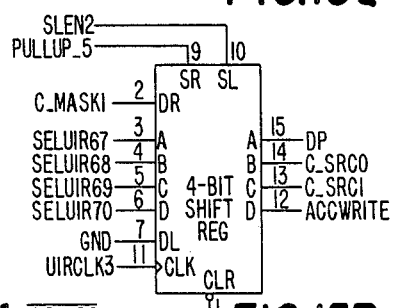
Figure 15W:
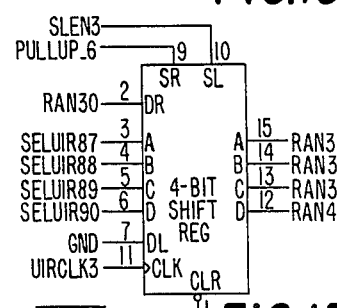
Figure 15N:
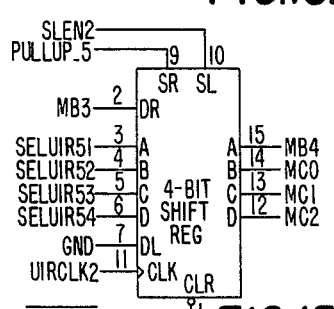
Figure 15S:
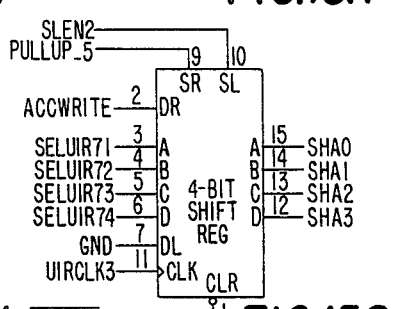
Figure 15X:
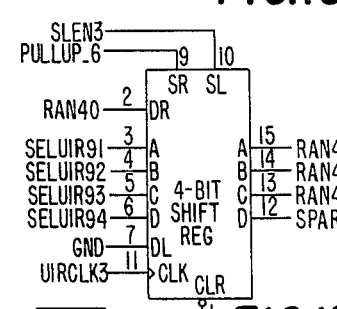
Figure 15O:
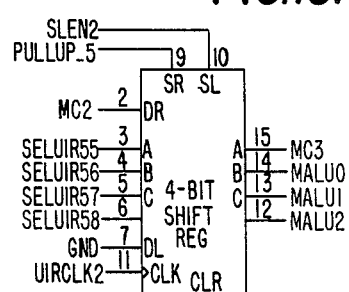
Figure 15T:
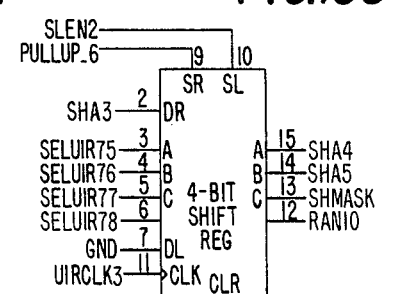
Figure 15Y:
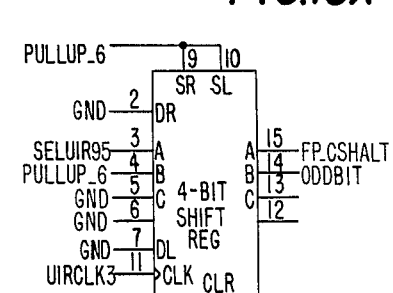

FIGS. 15A and 15B depict the microword register of the present invention.

Figure 16:
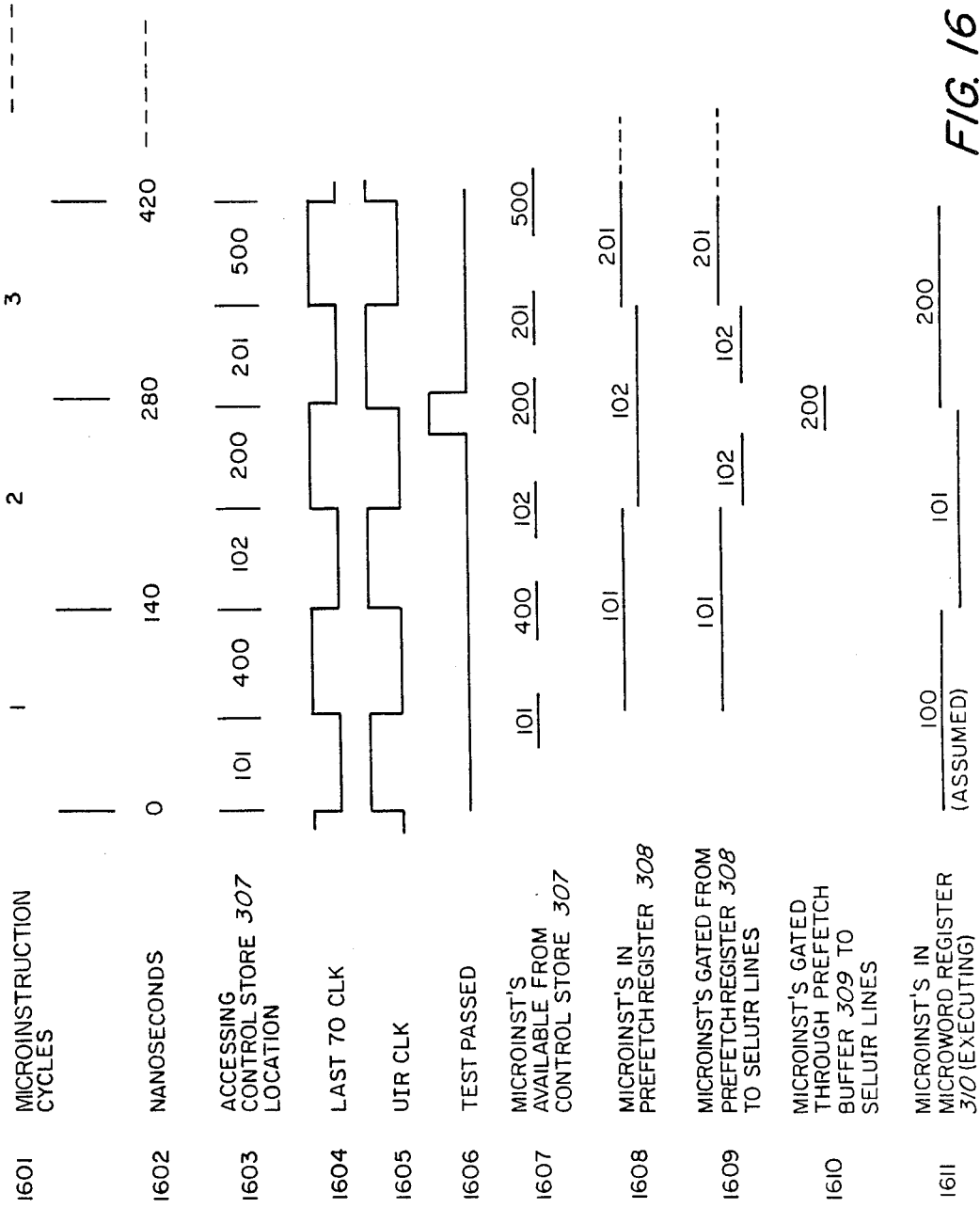

FIG. 16 is a detailed timing chart of a hypothetical microinstruction sequence running on the machine of the present invention.

Figure 17:
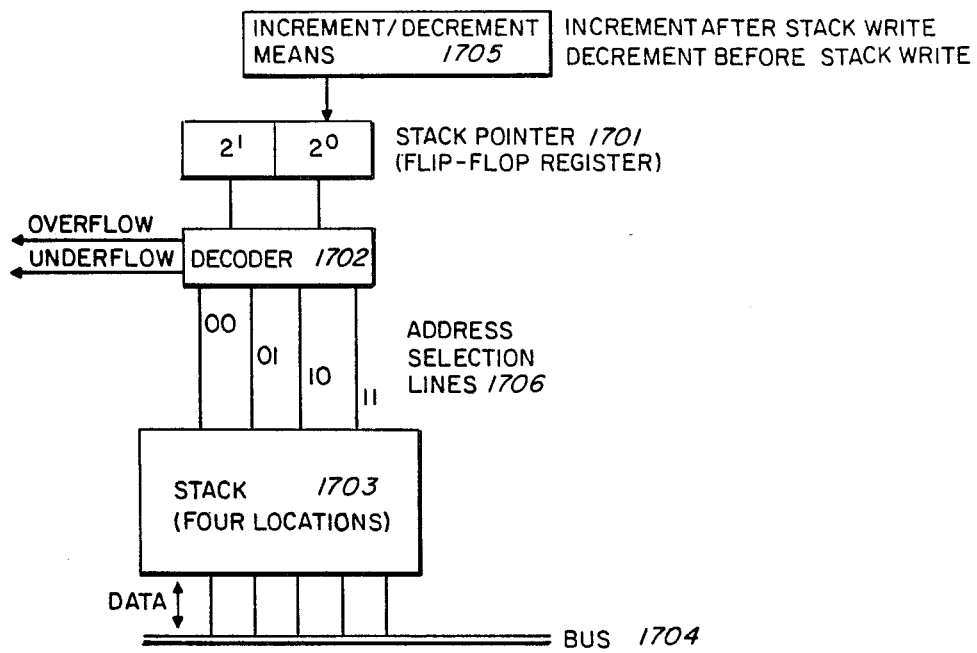

FIG. 17 shows a memory addressing scheme of the prior art.

Figure 18:
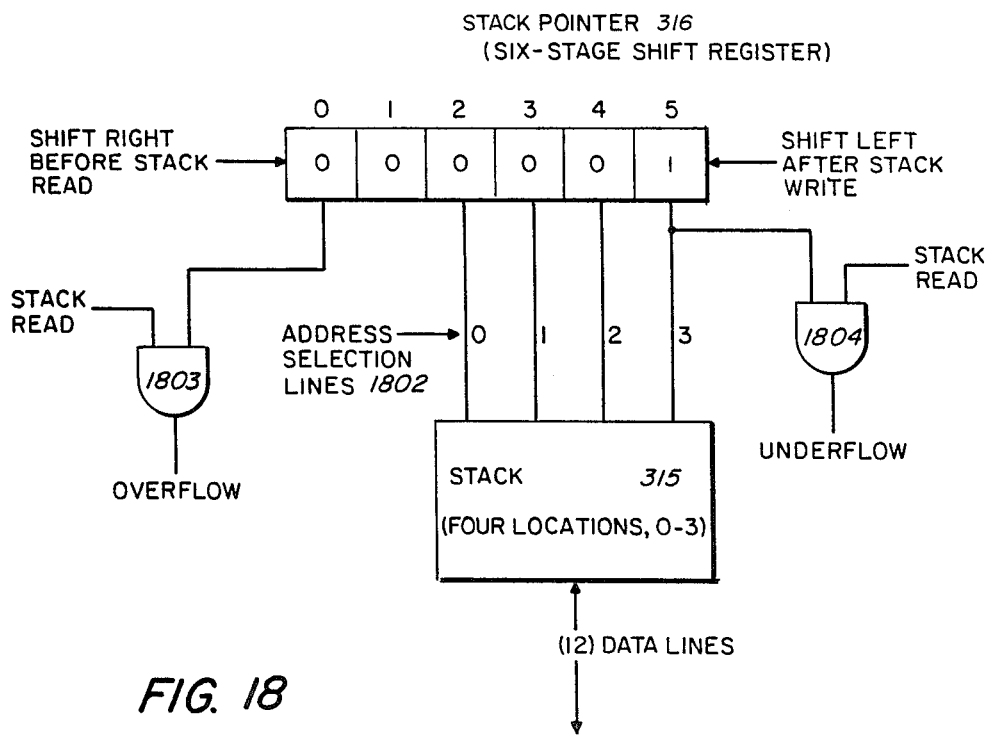

FIG. 18 is a high-level overview of the stack addressing scheme of the present invention.

Figure 19A:
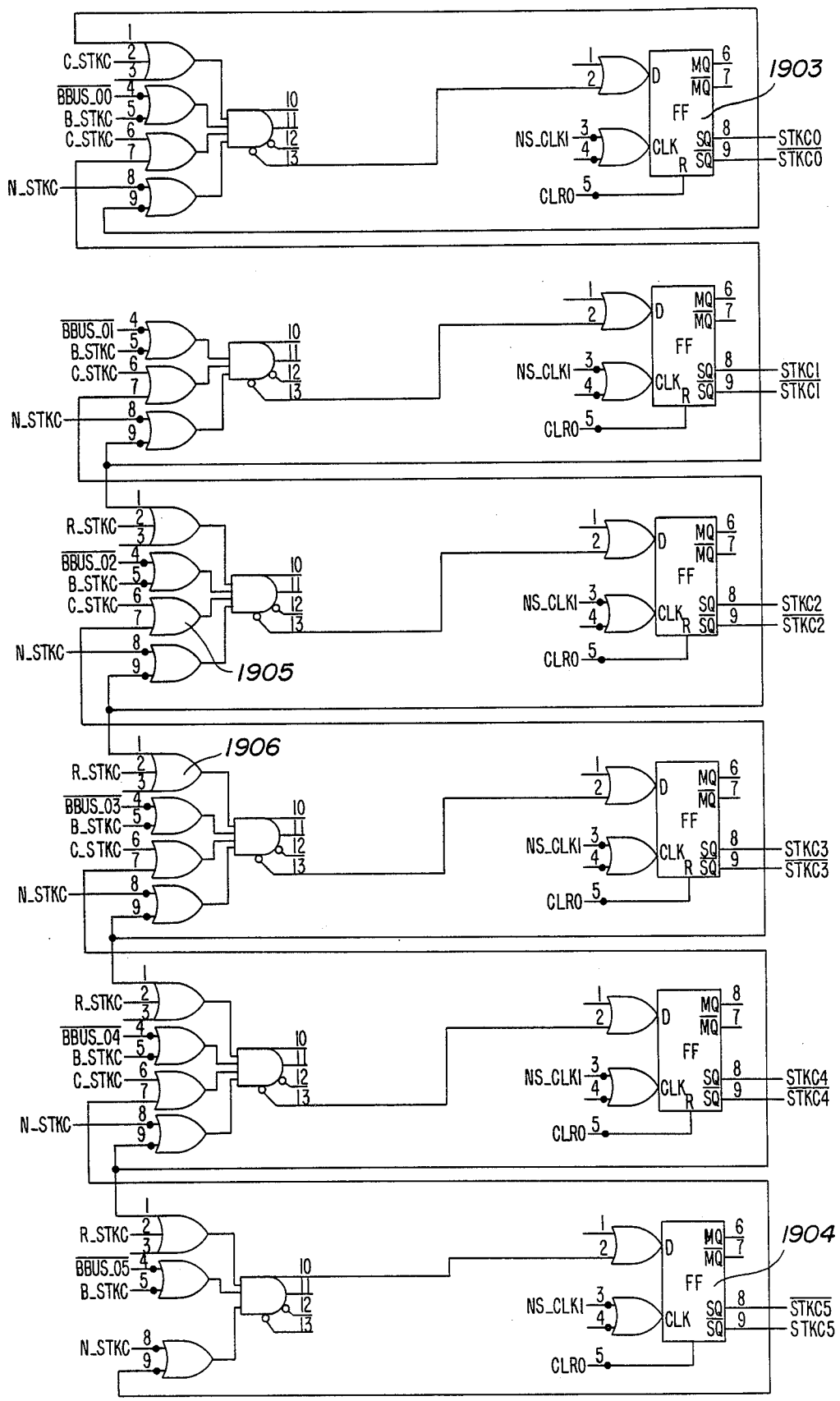
Figure 19B:
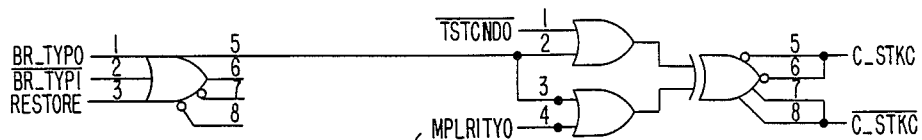
Figure 19C:
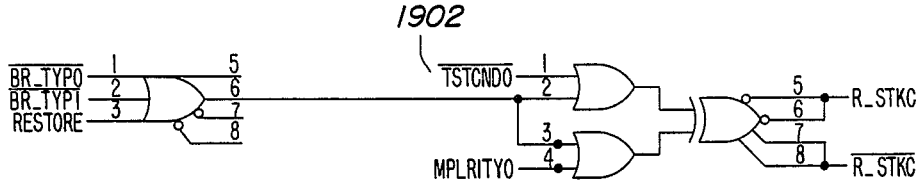
Figure 19D:
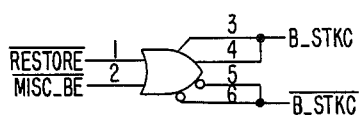
Figure 19E:
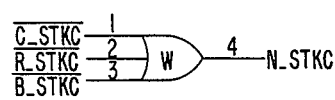
Figure 19G:
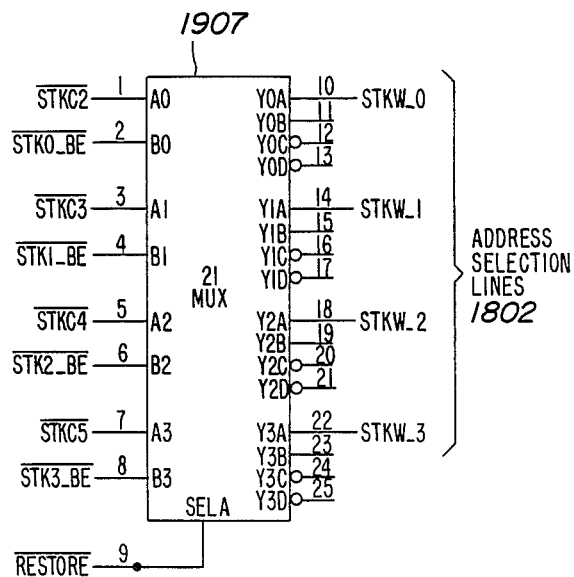
Figure 19F:
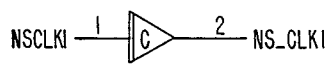

FIGS. 19A and 19B depict the stack pointer circuit of the present invention.

Figure 20A:
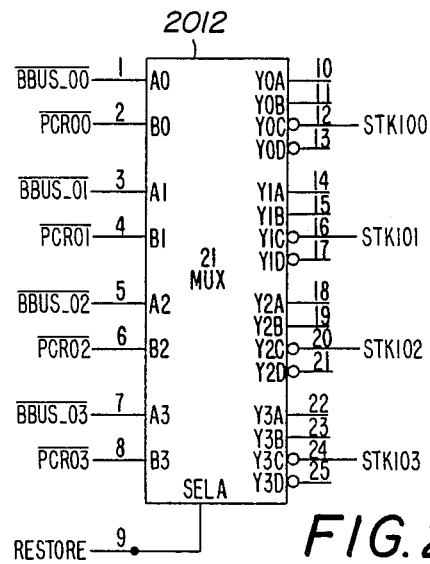
Figure 20B:
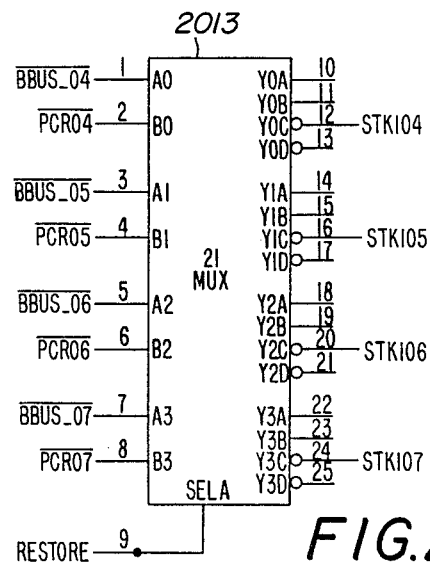
Figure 20C:
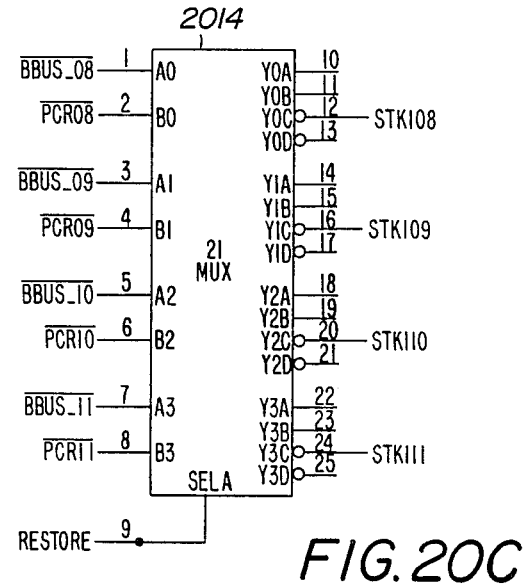
Figure 20D:
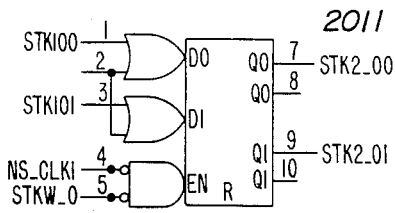
Figure 20J:
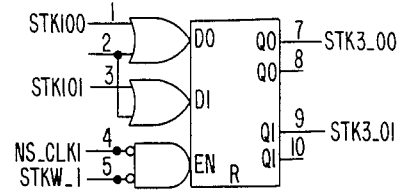
Figure 20E:
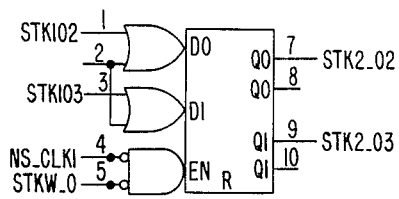
Figure 20K:
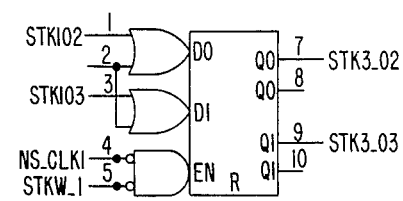
Figure 20F:
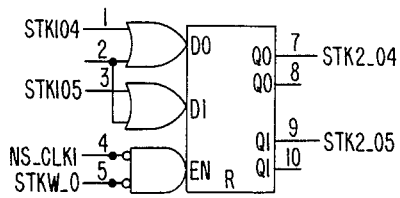
Figure 20L:
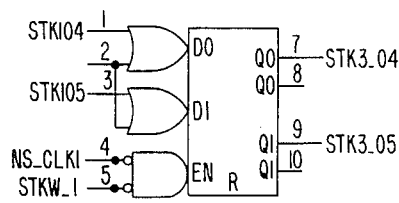
Figure 20G:
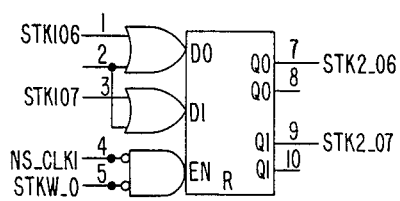
Figure 20M:
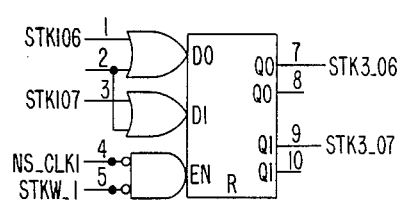
Figure 20H:
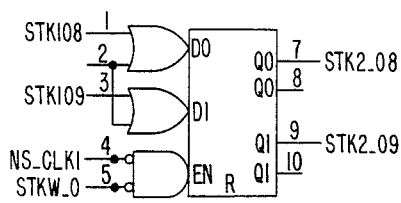
Figure 20N:
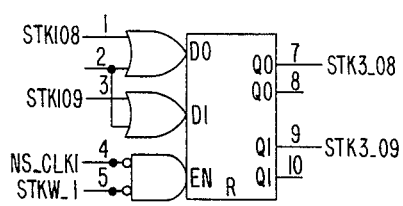
Figure 20I:
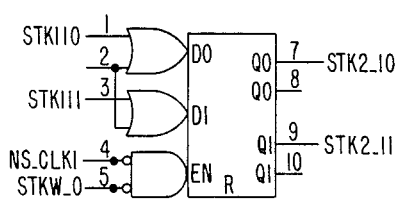
Figure 20O:
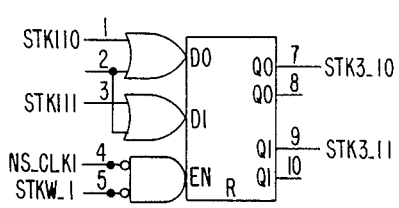

FIGS. 20A, 20B, and 20C show the stack of the present invention.

Figure 21E:
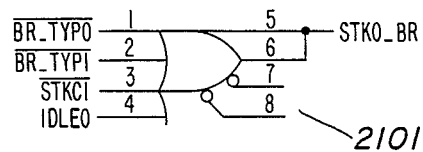
Figure 21F:
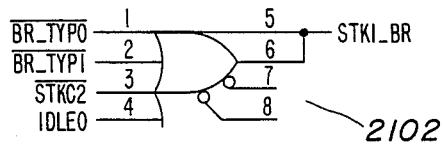
Figure 21G:
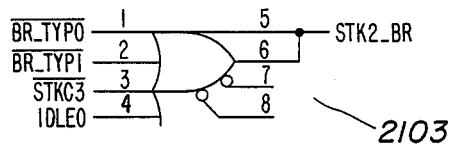
Figure 21H:
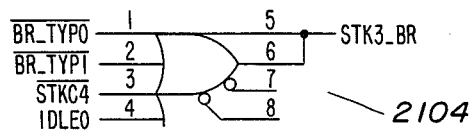
Figure 21I:
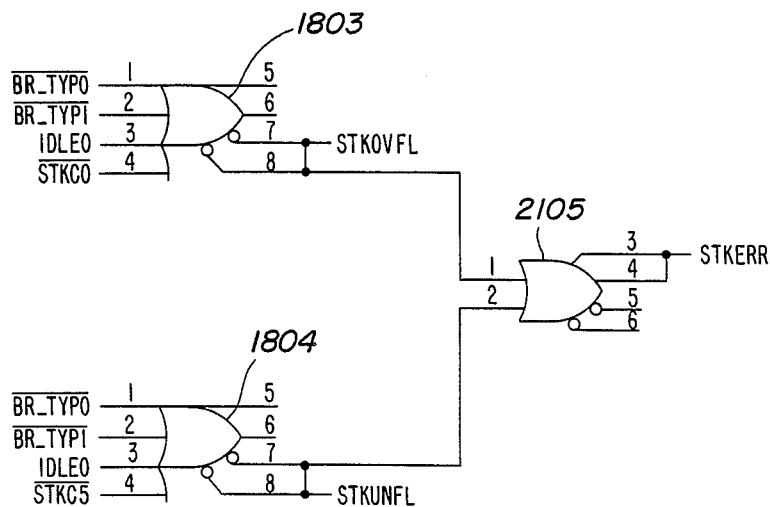
Figure 21A:
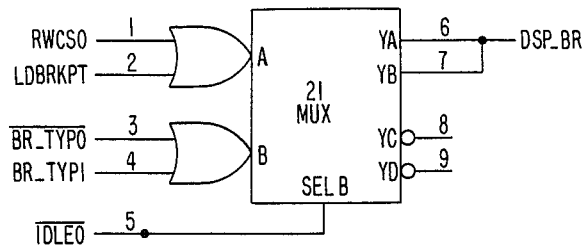
Figure 21B:
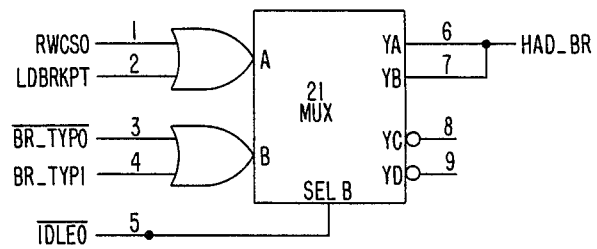
Figure 21C:
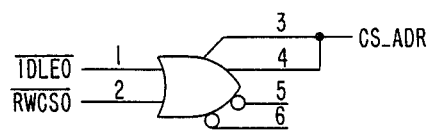
Figure 21D:
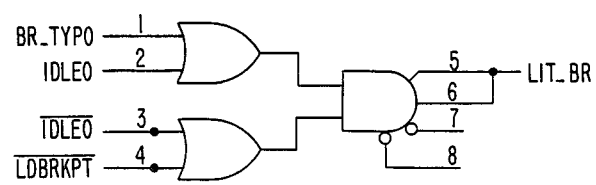
Figure 21J:
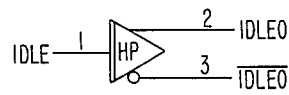
Figure 21K:
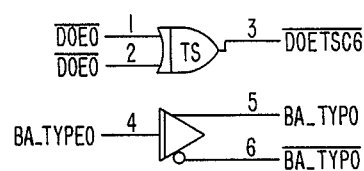
Figure 21L:
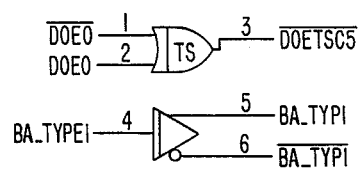
Figure 21M:
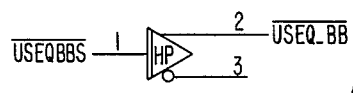
Figure 21N:
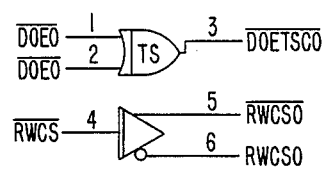
Figure 21O:
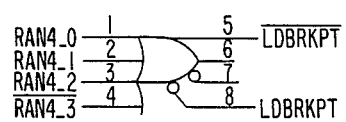

FIGS. 21A, 21B, and 21C show certain gating circuits of the present invention.

DETAILED DESCRIPTION

Table 1 outlines pertinent portions of a hypothetical microinstruction stream that will be used for illustrative purposes throughout this description:

TABLE 1

| LOC | CONTENTS | |
|-----|----------|---|
| 100 | COND. BRANCH TO 400 | (assume NOT taken) |
| 101 | COND. BRANCH TO 200 | (assume TAKEN) |
| 102 | (microinstruction) | (not reached) |
| * | * | |
| * | * | |
| * | * | |
| 200 | COND. BRANCH TO 500 | |
| 201 | (microinstruction) | |
| * | * | |
| * | * | |
| * | * | |

Figure 1:
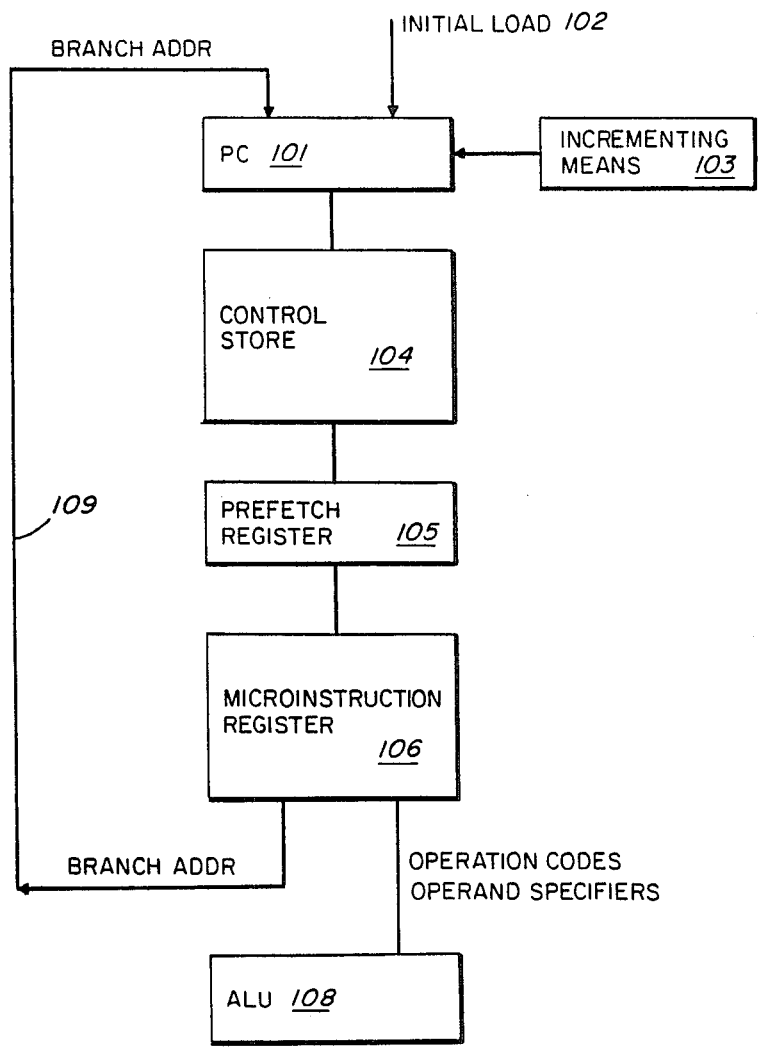
FIG. 1 is a block diagram of the microcode control scheme of a prior art machine employing microinstruction prefetching.

FIG. 1 shows the microinstruction fetching and execution portions of a prior art machine employing instruction prefetching. Program Counter (PC) 101 is initially loaded with the starting address of a desired sequence of microinstructions by initial load means 102. Control store 104 contains sequences of microinstructions.

During a microinstruction cycle, the contents of PC 101 are forwarded to control store 104, which fetches the microinstruction from the location whose address was received from PC 101, and forwards the fetched microinstruction to prefetch register 105. Increment means 103 increments PC 101 so that PC 101 is ready to address the next sequential microinstruction on the next fetch.

During the next microinstruction cycle the microinstruction from prefetch register 105 is transferred to microinstruction register 106 where it is decoded and then executed by ALU 108. ("ALU" denotes "arithmetic and logic unit", that portions of a computer's central processing unit that actually performs the operations specified by the instructions.) Concurrently with executing the microinstruction presently in microinstruction register 106, the next sequential microinstruction is prefetched by means described in the preceding paragraph.

If a microinstruction is to branch (either because it specifies an unconditional branch, or because it specifies a conditional branch and the condition is met) the branch address contained within or specified by a field of the branch microinstruction is input over lines 109 to PC 101, so that the next prefetch will be of the target microinstruction specified by the branch microinstruction.

Figure 2:
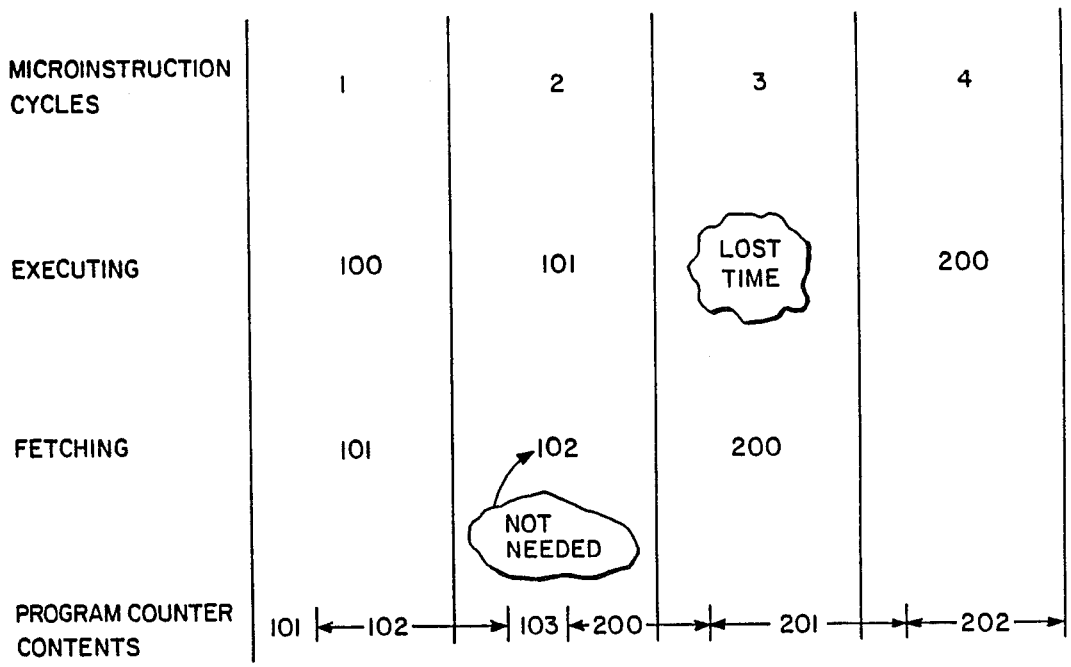
FIG. 2 is a timing chart depicting the timing of an assumed microinstruction sequence running on the prior art machine of FIG. 1.

FIG. 2 shows the timing that would result when the prior art machine depicted in FIG. 1 execute the microinstruction sequence of Table 1. Assuming that microinstruction 100 has been prefetched prior to cycle 1, it will be in the microinstruction register 106 and will be executed during cycle 1. Also during cycle 1, microinstruction 101 will be prefetched from the control store 104 under control of the PC 101, which, as described above, has been incremented to 101 after fetching microinstruction 100. After microinstruction 101 has been prefetched, the PC 101 is incremented to 102. Microinstruction 101 will be placed in the prefetch register 105. At the start of cycle 2, microinstruction 101 is transferred from the prefetch register 105 to the microinstruction register 106. It is executed during cycle 2. Also during cycle 2, microinstruction 102 will be prefetched and the PC 101 will be incremented to 103.

During execution of microinstruction 101, ALU 108 determines that the specified conditional branch is to take place, i.e., the next microinstruction to be executed is microinstruction 200. The number "200" from the branch address field of microinstruction 101 is loaded into the PC 101, overwriting the number "103" to which it had been incremented. Microinstruction 200 has not been prefetched—microinstruction 102 has been prefetched because it was not known at the beginning of cycle 2 that the branch to 200 would take place. (The specified conditions could not be examined until some point during cycle 2.) Thus cycle 3 is lost to the ALU 108, since the microinstruction it should execute during cycle 3 has not yet been fetched from control store 104. Cycle 3 must be devoted to prefetching microinstruction 200 from control store 104. PC 101 is incremented to 201, which is the instruction that will be fetched during cycle 4. Microinstruction 200 is transferred to the microinstruction register 106 at the start of cycle 4 for execution by ALU 108 during cycle 4.

Figure 3:
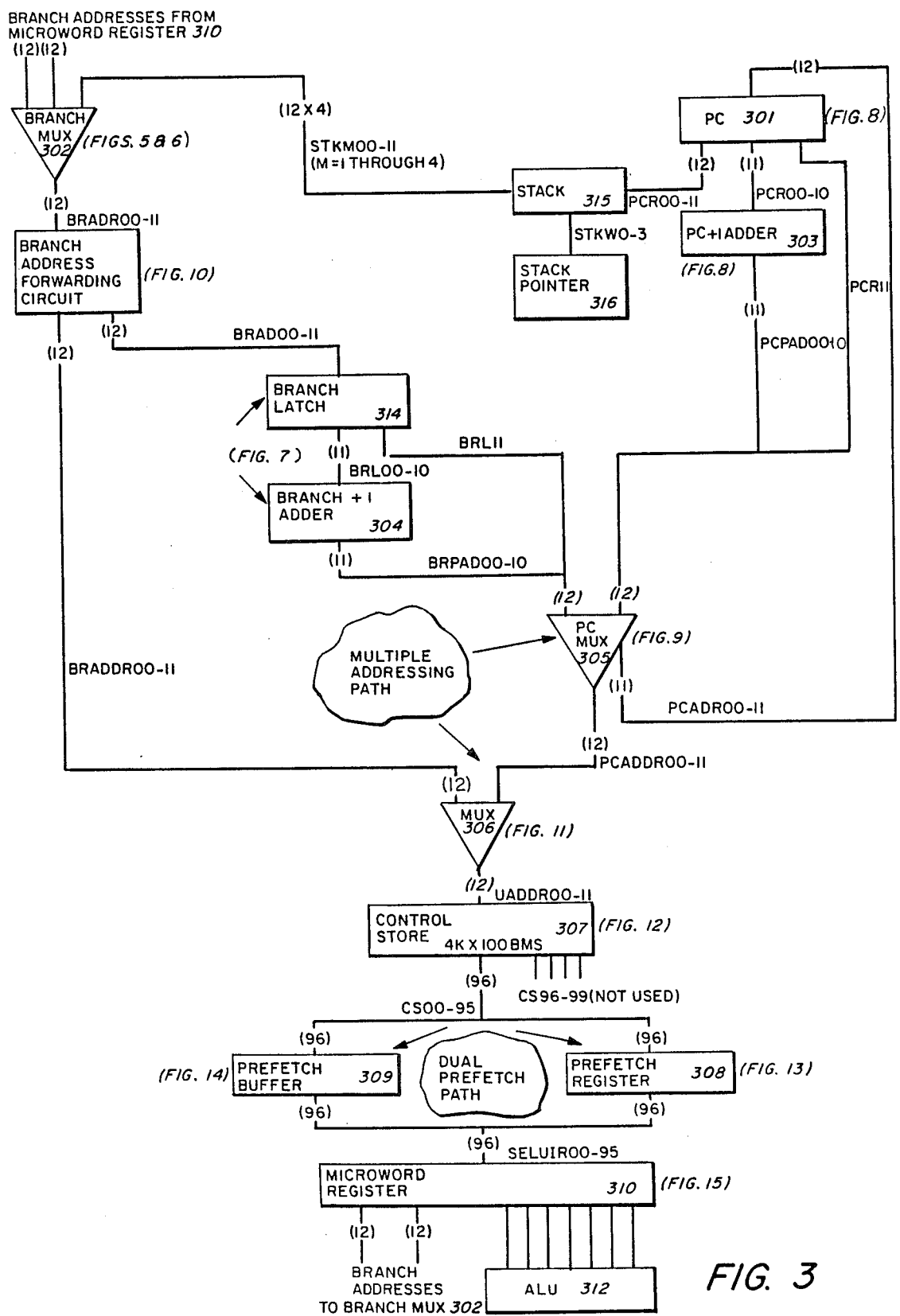
FIG. 3 is an overview of the microinstruction fetching scheme of the present invention.
Figure 5A:
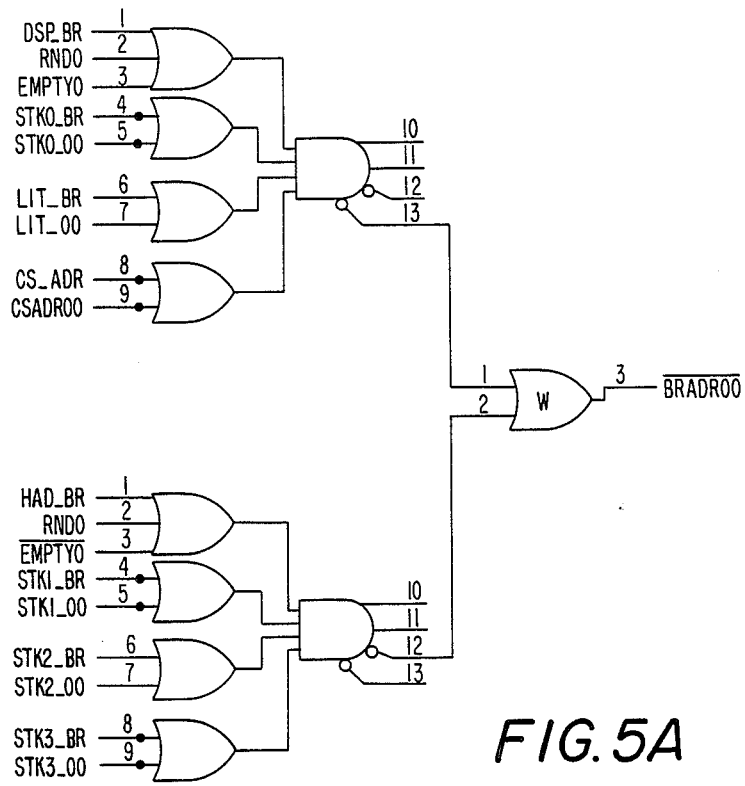
Figure 5B:
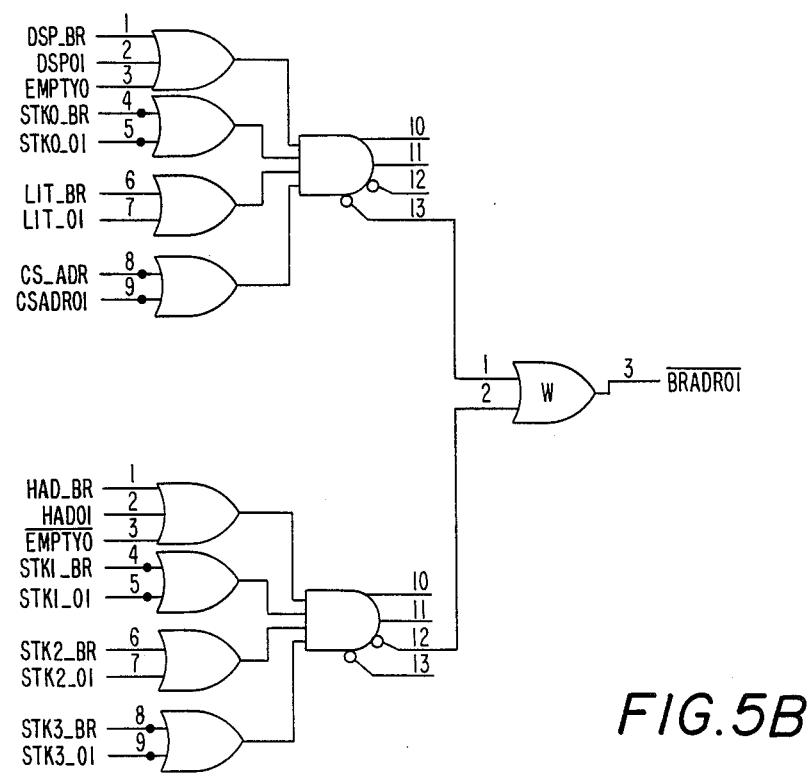
Figure 5C:
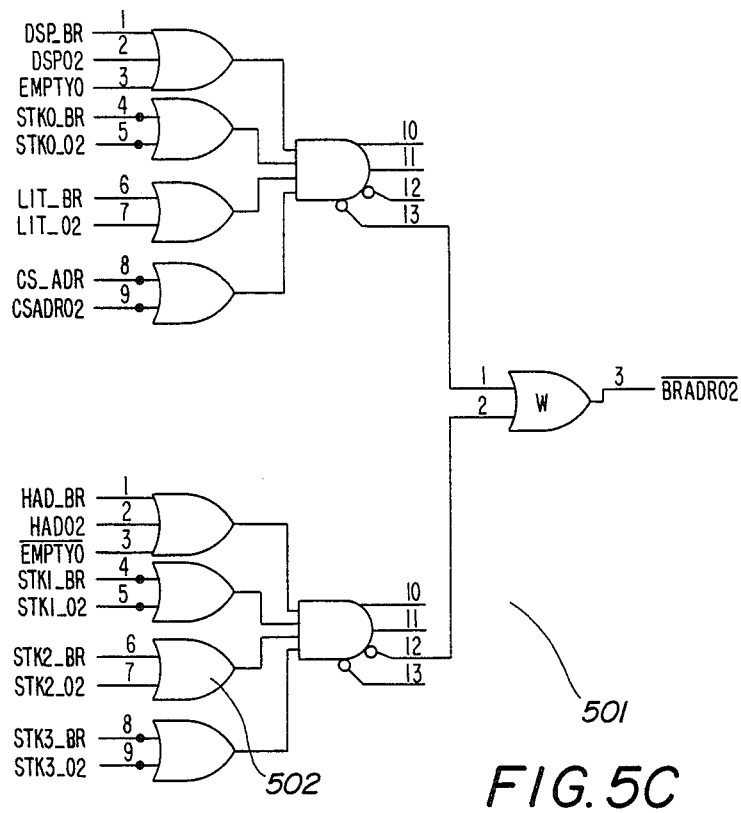
Figure 5D:
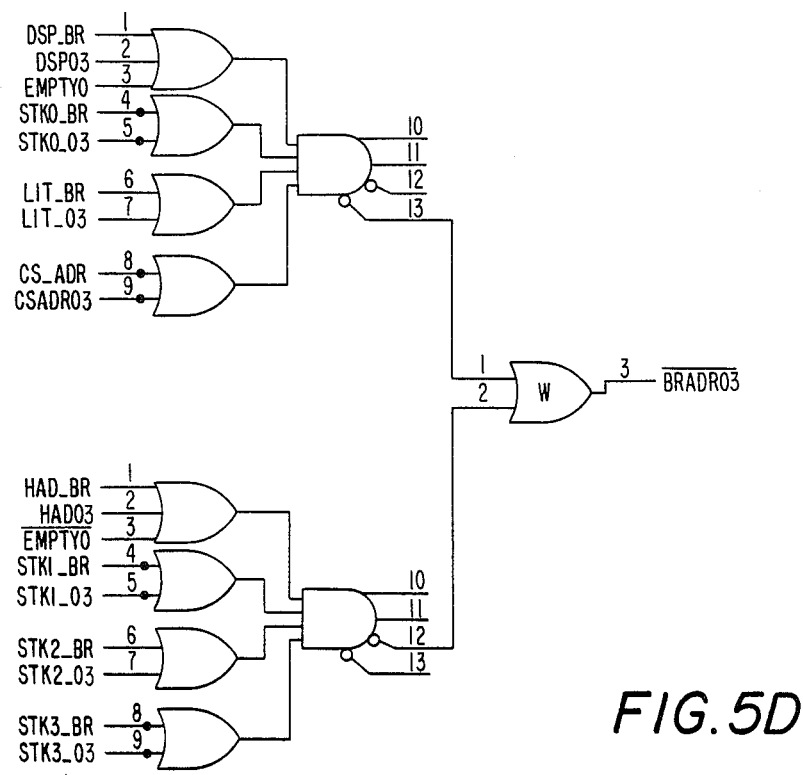
Figure 5E:
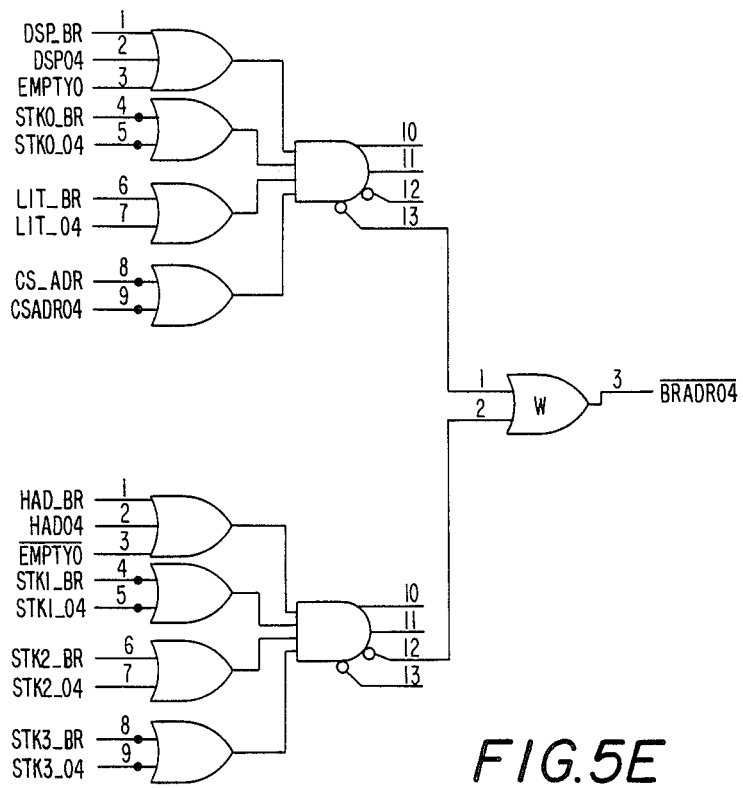
Figure 5F:
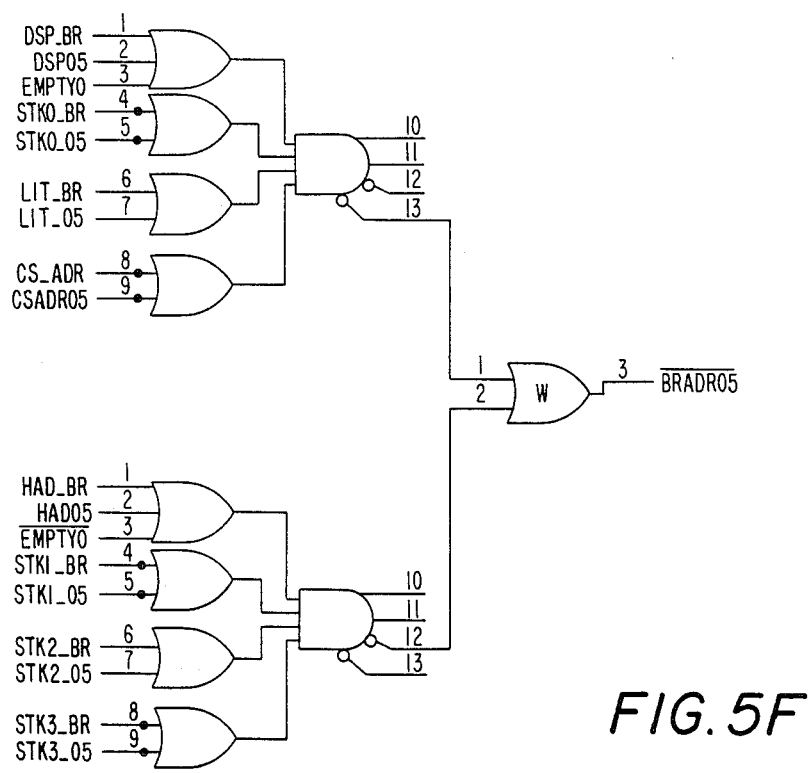
Figure 6A:
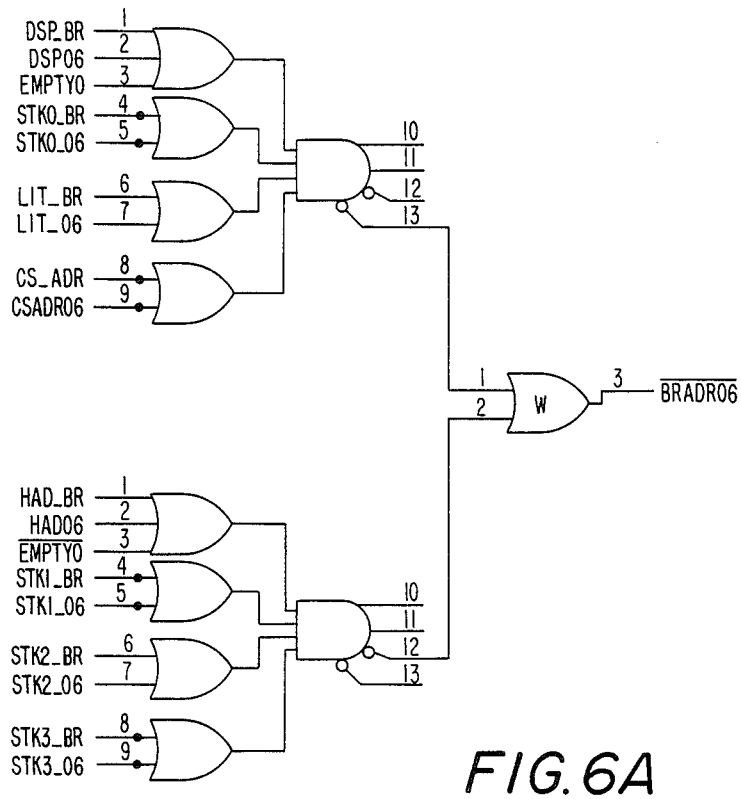
Figure 6B:
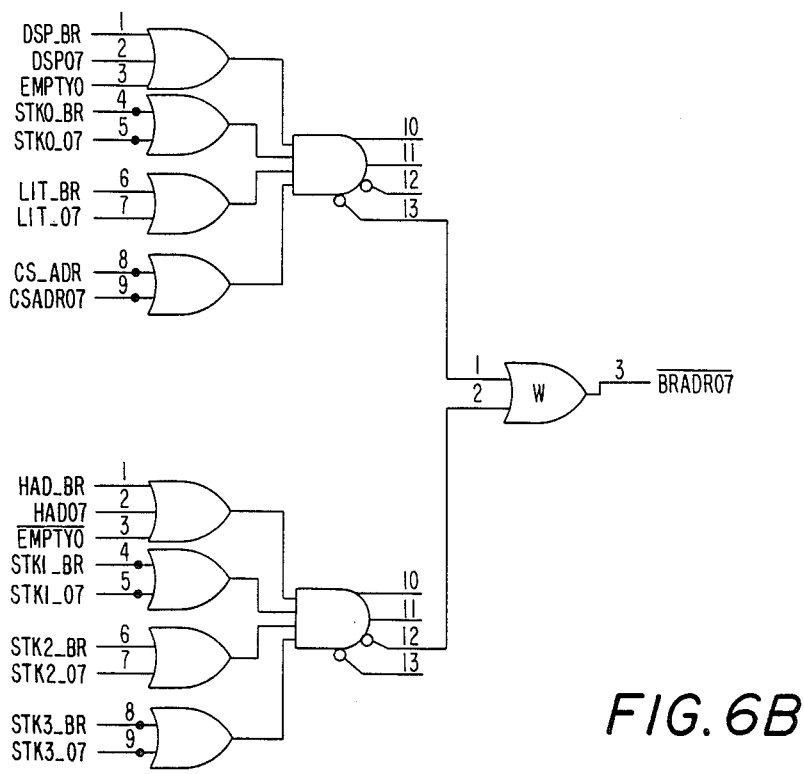
Figure 6C:
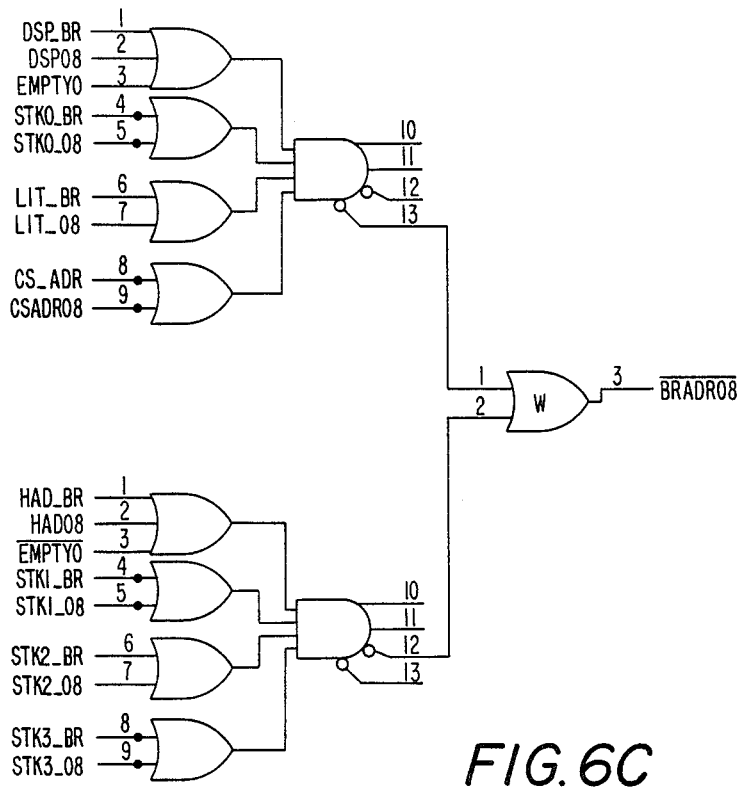
Figure 6D:
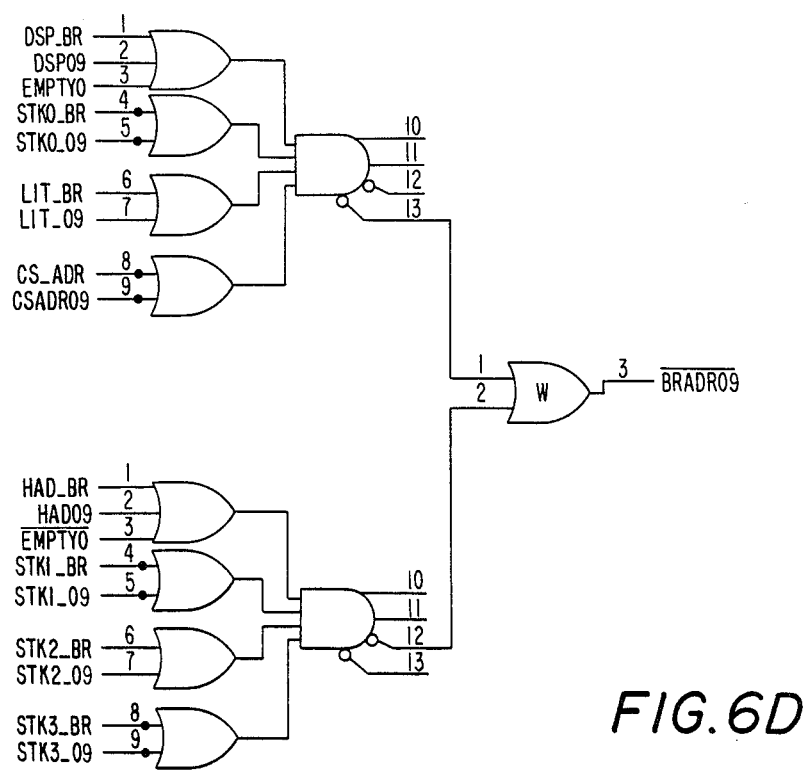
Figure 6E:
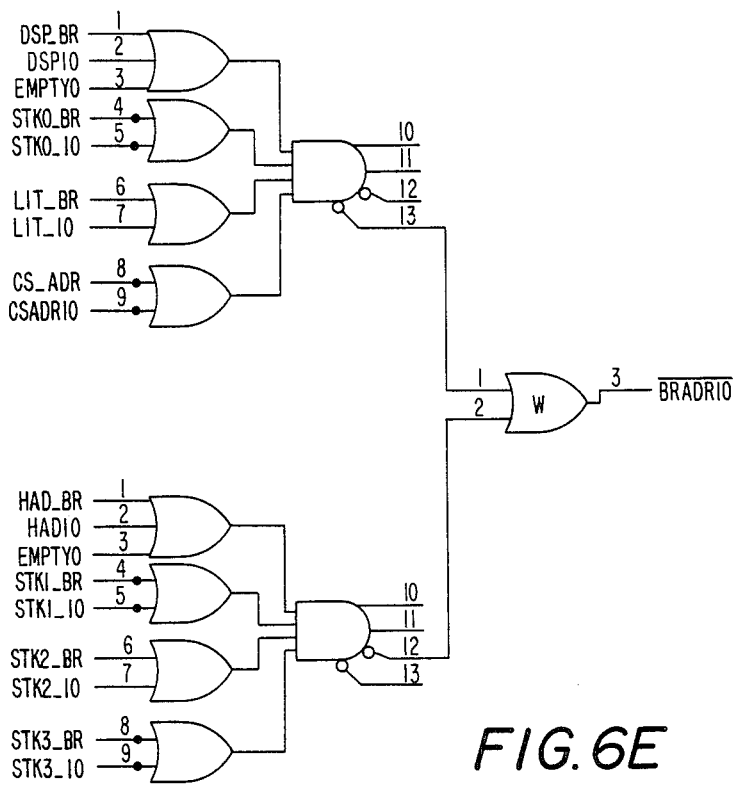
Figure 6F:
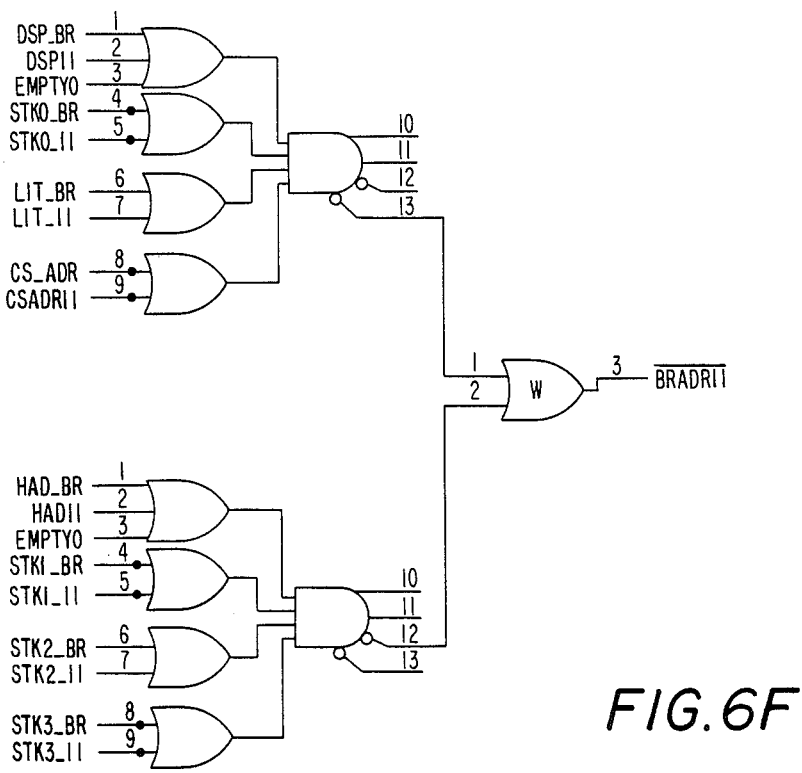

The prefetch scheme of the present invention, which eliminates the problem of lost instruction cycle time due to incorrect prefetches for conditional branches, is shown in high-level block diagram form in FIG. 3. (Subsequent figures will disclose more detail.) A major difference between the prior art and this invention is the dual prefetch path, comprising prefetch register 308 and prefetch buffer 309.

In the present embodiment, every microinstruction is a conditional branch, conditional call, or conditional return microinstruction. Thus, every instruction has the potential to specify either of two instructions as its successor in execution. Therefore, two microinstructions are prefetched during every microinstruction cycle. In embodiments wherein some microinstructions do not have this potential, it would be possible to prefetch only one microinstruction during the execution of those microinstructions.

During the first half of a microinstruction's execution cycle, prefetch register 308 receives the next sequential microinstructions from control store 307; during the second half, prefetch buffer 309 receives the branch target microinstruction from control store 307. Either prefetch register 308 or prefetch buffer 309 may load microword register 310 with the microinstruction to be executed next, depending on the determination made during the current execution cycle of whether the branch is to be taken.

The addresses used to prefetch microinstructions are provided to control store 307 by MUX 306, which may obtain the addresses from any of three sources: (1) branch addresses obtained from (a) the current microinstruction in microword register 310 or (b) from stack 315, one being selected and passed through branch MUX 302 and forwarding circuit 313; (2) a previous branch address stored in branch latch 314, as incremented by branch +1 adder 304 and passed through PC MUX 305; or (3) PC (program counter) 301, as incremented by PC +1 adder 303 and passed through PC MUX 305. PC MUX 305 can load PC 301 to ready it for its next use, loading it with either its former contents as incremented by PC +1 adder 303, or the branch address from branch latch 314 as incremented by branch +1 adder 304. The interactions between these three address source paths and the PC loadng path will be discussed in detail below.

When executing call instructions, the contents of PC 301 are retained in stack 315 for use by subsequent return instructions, in addition to being retained in PC 301. Stack pointer 316 controls the addressing of stack 315 as will be discussed further on.

The microinstructions fetched by control store 307 are, as mentioned above, brought to microword register 310 either through prefetch buffer 309 or prefetch register 308. Once in microword register 310, they are executed by ALU 312. ALU 312, which executes the microinstructions contained in microword register 310, can be a conventional ALU and will not be described herein.

Control store 307 is accessed twice per microinstruction cycle: once to prefetch the microinstruction that is stored sequentially after the microinstruction which is currently executing, and once to prefetch the branch target microinstruction of the microinstruction that is currently being executed. At the conclusion of executing the current microinstruction, at which time it will be known whether a conditional branch is to take place, both possible next microinstructions have been prefetched and execution of the correct one of the two can commence without any delay to fetch a different microinstruction.

Prefetching the next sequential microinstruction is done during the first half of the microinstruction execution cycle, and proceeds in one of two ways, depending on whether the currently executing microinstruction was reached sequentially from a previous microinstruction, or was reached by being a branch target. The reason for this distinction will become evident during the discussion of how branches are effected.

First, consider the case where the currently executing microinstruction was reached because it was a branch target microinstruction. Its address is stored in branch latch 314, for reasons that will be described later. The address of the currently executing microinstruction, now stored in branch latch 314, is incremented by one by branch +1 adder 304 to indicate the next sequential microinstruction in the path after the currently executing microinstruction. The incremented address is selected by PC MUX 305, in response to a timing signal, and passed to MUX 306 to control store 307, which will use that address to prefetch the next sequential microinstruction.

Second, consider the case where the currently executing microinstruction was reached sequentially from a previous microinstruction, and not as a result of a branch. Its address is stored in PC 301 for reasons that will be described as the description progresses. PC +1 adder 303 increments the address by one so as to denote the next sequential microinstruction. The incremented address is selected by PC MUX 305, in response to a timing signal, and passed through MUX 306 to control store 307, which uses that address to prefetch the next sequential microinstruction.

The next sequential microinstruction regardless of whether its address was obtained from branch latch 314 or PC 301, is stored in prefetch register 308 pending the determination of whether the currently executing microinstruction is to branch, as discussed below.

Prefetching the branch target microinstruction of the currently executing microinstruction is done during the second half of the current microinstruction cycle. Branch addresses 311, specified in the currently executing microinstruction contained in microword register 310 or obtained from stack 315, are forwarded to branch mux 302 which selects the appropriate one of the branch addresses (in response to the ALU and bused upon the currently executing microinstruction) and forwards it through branch address forwarding circuit 313 and through MUX 306 as the address input to control store 307. Control store 307 fetches and applies the 96-bit branch target microinstruction to the inputs of prefetch buffer 309. The branch target microinstruction is then available to be gated through prefetch buffer 309 in the event that it is needed; i.e., that the conditional branch specified in the currently executing microinstruction is to be taken. The branch address from branch address forwarding circuit 313 is retained in branch latch 314 for possible use during the first half of the next microinstruction cycle.

Near the end of the current microinstruction cycle, ALU 312 determines, from current conditions, whether the currently executing microinstruction is to branch. If it is, then the branch target microinstruction, which is now available at the inputs of prefetch buffer 309, is gated through prefetch buffer 309 and into microword register 310, where ALU 312 will execute it during the next cycle.

Alternatively, if the current microinstruction is not to branch, then the next sequential microinstruction, which, as discussed previously, is stored in prefetch register 308, is gated into microword register 310, where ALU 312 will execute it during the next cycle. Also, if the current microinstruction is not to branch, PC MUX 305 at this time loads PC 301 with the address of the next sequential microinstruction, which as previously discussed is either the contents of branch latch 314 incremented by one, or the old PC 301 contents incremented by one. Thus, at the start of execution of the next microinstruction, its address is contained in PC 301 if it was reached sequentially. Conversely then, if the next microinstruction was a branch target, the contents of PC 301 are disregarded and the microinstruction's address will be found, as discussed above, in branch latch 314. Sequential execution from that point will proceed accordingly from either the PC 301 or the branch latch 314 addresses.

Figure 4:
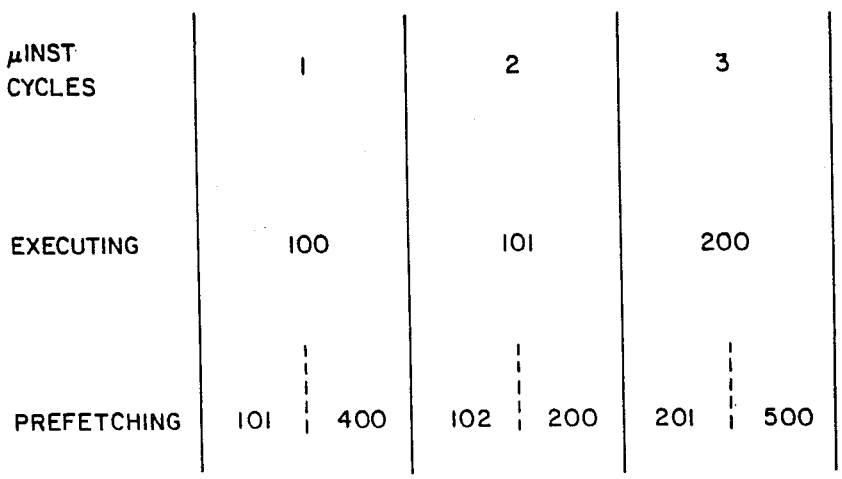
FIG. 4 is a timing chart depicting the timing of an assumed microinstruction sequence running on a machine embodying the present invention.

FIG. 4 shows the timing when executing the microinstruction sequence of Table 1 on the microcomputer using the present invention. During microinstruction cycle 1, microinstruction 100 is executing. (In the present embodiment, the microinstruction cycles are each 140 nanoseconds (ns) in duration.) During the first 70 ns of cycle 1, microinstruction 101 (the next sequential microinstruction) is prefetched, as previously discussed, to prefetch register 308. During the last 70 ns of cycle 1, microinstruction 400 (the target of the conditional branch of microinstruction 100) is prefetched, as discussed above, to prefetch buffer 309. At the conclusion of cycle 1 the execution logic determines (as has been described) that the conditional branch to 400 is not to be taken; thus microinstruction 101 will be transferred from the prefetch register 308 to the microword register 310, and will be the microinstruction to be executed during cycle 2, the next cycle. Microinstruction 400, available through prefetch buffer 309, is ignored.

During the first 70 ns of cycle 2, microinstruction 102 (the next sequential microinstruction) is prefetched to the prefetch register 308, and during the second 70 ns microinstruction 200 (the conditional branch target microinstruction) is prefetched to the prefetch buffer 309. At the conclusion of cycle 2 the execution logic determines that the conditional branch to microinstruction 200 is to be taken; microinstruction 200 is transferred through the prefetch buffer 309 to the microword register 310 and thus will be executed during cycle 3. Microinstruction 102, in prefetch register 308, is ignored. No time is lost between microinstruction because of incorrect prefetches; both possibilities of a branch are always prefetched.

Now follows a detailed description of FIGS. 4 through 15B, which depict the logic circuits implementing the present invention. Refer to FIG. 3 while referring to these figures, and particularly to the reference signal names shown on FIG. 3. Certain timing signals will be mentioned in the discussion. Timing constraints have been discussed above, and will be further discussed in conjunction with FIG. 16. The generation of timing signals to conform to stated constraints is well known in the literature and will not be detailed herein.

FIGS. 5 and 6 together depict the logic of branch MUX 302. A MUX (a common designation for "multiplexor") is a device for selecting one of a plurality of signals. Branch MUX 302 is used to select one of branch addresses 311. Since control store 307 has a capacity of 4096 locations, a 12-bit address is required to address any of those locations. Branch MUX 302, then, has the ability to select one of a plurality of 12-bit branch addresses. FIGS. 5A, 5B, 5C, 6A, 6B, and 6C depict twelve similarly configured logic groups, each for handling a different one of the requisite twelve bits, numbered 00 through 11. Group 501 on FIG. 5A (for handling bit 02) is deemed to be representative of the twelve logic groups: it has multiple inputs, those inputs bit 02 of each of branch addresses 311 originating from bit positions of microword register 310 or from stack 315 as will be discussed further on. By means of gating, group 501 selects one of those as the one to output as signal BRADR02. Methodologies of laying out instruction sets, including methodologies of specifying branch addresses, are well known in the literature and will not be discussed herein. Designs for combinatorial gating to select one of a plurality of inputs are likewise well known, and will likewise not be discussed herein. In the manner in which group 501 produces signal BRADR02, all twelve logic group working in concert produce the twelve bit branch address BRADR00 through BRADR11, which is input to branch address forwarding circuit 313, depicted in FIG. 10.

FIGS. 7A and 7B show the logic comprising branch latch 314 and branch +1 adder 304. Elements 701 through 707 comprise branch latch 314. 701 and 702 are single latch circuits, and 703 through 707 are dual latch circuits, yielding a total of 12 latch circuits for containing the twelve-bit addres. (A latch is a bistable circuit which, when its clock input is a logic high will simply pass the state of its dat input through to the data output, and which stores the state of the data input at the time its clock input transits to a logic low.) The twelve-bit input to branch latch 304 is the address BRAD00 through BRAD11 from branch address forwarding circuit 313 (FIG. 10), which is stored in branch latch 314 and then appears on signal line BRL00 through BRL11. These signal lines are input to half adders 708 through 718, which comprise branch +1 adder 304. The operation of half adders is known in the literature and will not be discussed here. The output of branch +1 adder 304 is the 11 address bits BRPAD00 through BRPAD10. Bit 11 (the least significant bit) is not included in the increment calculation because binary addition by one simply toggles (complements) the least significant bit. This toggling is accomplished at the input of PC MUX 305, to be discussed with FIGS. 9A, 9B, and 9C. The cntents of bits 00 through 10, in conjunction with a toggled state of bit 11, together represent a 12-bit address which is one greater than the 12-bit address in branch latch 314. This address is output to PC MUX 305 (FIG. 9).

FIGS. 8A and 8B depict 12 flip-flops 801 through 812 comprising PC 301 and half-adders 813 through 823 comprising PC +1 adder 303. (A flip-flop is a bistable circuit which stores a state of one binary bit at the time its clock input make a transition.)

Inputs are the address PCADR00 through PCADR11 from PC MUX 305 (FIGS. 9A, 9B, and 9C). Operation is similar to that of branch latch 314 and branch +1 adder 304. Outputs PCPAD00 through PCPAD10 are input to PC MUX 305 (FIG. 9).

FIG. 9 is the logic diagram of PC MUX 305. 2:1 MUX's 901, 902, and 903 each handle four bits of the total 12 bit address. Two twelve-bit addresses are presented as the inputs: PCPAD00 through PCPAD10 and PCR11 from PC 301 and PC +1 adder 303; and BRPAD00 through BRPAD10 and BRL11 from branch latch 314 and branch +1 adder 304. Note that the inverse states of the PCPAD and BRPAD signals are input to the 2:1 MUX's, but the non-inverse states of PCR11 and BRL11 are input (pins A3 and B3 of 2:1 MUX 903); this accomplishes the toggling of the least significant bit mentioned above in connection with incrementing by one. One of the two twelve-bit addresses is selected depending on the conditions previously discussed, and is output as the twelve-bit address PCADDR00 through PCADDR11 to MUX 306 (FIG. 11), and as the twelve-bit addres PCADR00 through PCADR11 to PC 301 (FIG. 8).

FIG. 10 depicts the logic diagram of branch address forwarding circuit 313. It receives the twelve-bit branch address BRADR00 through BRADR11 from branch MUX 302 (FIGS. 5A, 5B, 5C, 6A, 6B, and 6C), and generates, by conventional gating means, the twelve bit branch address BRADDR00 through BRADDR11 to MUX 306 (FIG. 11), and the twelve-bit branch address BRAD00 through BRAD11 to branch latch 314 (FIG. 7). The output address has the same value as the input address, but is established in the necessary timing relationships previously discussed.

FIG. 11 depicts the logic diagram of MUX 306, constructed of three eight-bit 3916 buffer line drivers 1101, 1102, and 1103. Each of these has the ability to function as a 2:1 MUX: a logic low on pin 1 causes the signals on pins 2, 4, 6, and 8 to be passed to output pins 18, 16, 14, and 12 respectively; a logic low on pin 19 causes input signals on pins 11, 13, 15, and 17 to pass to output pins 9, 7, 5, and 3 respectively. It is seen that the 24 output pins are connected together in 12 pairs. (For example, pin 18 of buffer line driver 1102 bears the signal name UADDR00, and pin 9 of buffer line driver 1103 bears the same signal name. This implicitly indicates that those two pins are wired together.) Thus, depending on the state of the signal UIRCLK 1101 (to be discussed in more detail in the discussion of FIG. 16) either the 12-bit address BRADDR00 through BRADDR11, or the 12-bit address PCADDR00 through PCADDR11, will be gated through to the lines UADDR00 through UADDR11, which act as the address input to control store 307 (FIG. 12).

FIGS. 12A, 12B, and 12C comprise the logic diagram of control store 307, which comprises twenty-five 4K by 4 bit RAM chips, resulting in a 4K by 100 bit store. The twelve bit address UADDR00 through UADDR11 is applied in parallel to each of the twenty-five chips which, assuming the CWRITEn signals to be FALSE, each output four of the bits of the location specified by the address. (CWRITEn will be TRUE only when loading control store 307, not discussed herein.) The 100 output lines CS00 through CS99 comprise the 100 bit output of control store 307. Only the 96 bits CS00 through CS95 are presently used in the current embodiment.

FIGS. 13A and 13B and are the logic diagrams of prefetch register 308, while FIGS. 14A and 14B are the logic diagrams of prefetch buffer 309, which together comprise the dual prefetch path of the present invention. Prefetch register 308 comprises a 96 bit register, packaged as 12 octal (i.e., eight circuits per package) flip-flop chips. It is loaded, as previously discussed, with the microinstruction that is to be executed next if the current microinstruction does not branch, the microinstruction appearing on the control store 307 outputs CS00 through CS95 at the end of the first 70 ns of the 140 ns microinstruction cycle, as controlled by the signal LAST70CLKn coming TRUE. The 96 outputs SELUIR00 through SELUIR95 (when enabled by the by the FALSE state of the output-enable signal TESTPASSEDn) are the inputs to microword register 310. If the current microinstruction is not to branch, the microinstruction from prefetch register 308 will thus be transferred to microword register 310 and become the next executing microinstruction.

Prefetch buffer 309 comprises 12 octal buffer line drivers. Note that these are not flip-flops, and thus the prefetch buffer 309 is not a register; (i.e., it does not store the control store 307 outputs, but only passes them on to microword register 310). When enabled by the TRUE state of the TESTPASSEDn signal, prefetch buffer 309 passes the branch target microinstruction, appearing on the 96 control store 307 outputs CS00 through CS95 at the conclusion of the current microinstruction cycle through to the microword register 310 inputs on lines SELUIR00 through SELUIR95. If the current microinstruction is to branch, it is through this path that the target microinstruction becomes the next executing microinstruction.

FIGS. 15A and 15B are the logic diagram of microword register 310, comprising 25 4-bit shift register chips. The inputs are the 96 line SELUIR00 through SELUIR95, which which are discussed above come from prefetch register 308 if the present microinstruction is not to branch, or through prefetch buffer 309 if the present microinstrucrtion is to branch. SELUIR00 through SELUIR95 will be clocked into microword register 310 by the TRUE-transition of the signal UIRCLKn 1501. The outputs of microword register 310 directly control the processing elements of the microprocessor (the ALU 312); thus, the microinstruction that is loaded into microword register 310 becomes the executing microinstruction.

FIG. 16 shows detailed timings of the interactions between control store 307, prefetch register 308, prefetch buffer 309, and microword register 310 for the instruction sequence of Table 1. Line 1601 defines 3 consecutive microinstruction cycles, and line 1602 associates the with nanosecond timing. It is assumed that microinstruction 100 (from Table 1) is executed during cycle 1. Given that microinstruction 100 is a conditional branch to 400, which is assumed not to be taken, we now consider how microinstruction 101 (the next sequential microinstruction) is executed during cycle 2.

It is assumed that the currently executing microinstruction, microinstruction 100, was reached by being the next sequential instruction microinstruction to a previously executed microinstruction. As previously discussed, its address (100) is at this time contained in PC 301. (Had it been reached as a branch target its address would be in branch latch 314, as previously discussed.) As previously described, during the first 70 ns of cycle 1 the address (100) of microinstruction 100 is incremented by one, to 101, through PC +1 adder 303, fed through PC MUX 305 and MUX 306 to control store 307. Late during the first 70 ns of cycle 1, the microinstruction from location 101 is available at the control store outputs, as shown by line 1607. As line 1604 shows, the signal LAST70CLK 1302 goes TRUE during this time, storing the microinstruction in prefetch register 308 (see FIGS. 13A and 13B). As line 1608 shows, microinstruction 101 remains stored in prefetch register 308 until the next TRUE-transition of LAST70CLK, 140 ns later. During the last 70 ns of cycle 1, control store 307 is accessed with the branch address of target microinstruction 400, as obtained from currently executing microinstruction 100. As previously described, this is obtained through branch MUX 302 and MUX 306. Branch target microinstruction 400 is available at the CS outputs late in cycle 1, as line 1607 shows. Reference to FIG. 14 reveals that the control store outputs are input to prefetch buffer 309; however, they will not be gated through prefetch buffer 309 at this time because signal TESTPASSED is not TRUE (line 1606). TESTPASSED is TRUE if the current microinstruction is to branch, and our assumption is that current microinstruction 100 will not branch. Meanwhile, with reference to FIGS. 13A and 13B, the FALSE state of TESTPASSED 1401 enables the contents of the prefetch register 308 (those contents being microinstruction 101) to be gated onto the SELUIR lines, as shown on line 1609. At time 140 ns, signal UIRCLK goes TRUE (line 1605). Referring to FIGS. 15A and 15B, this transition of UIRCLK clocks the SELUIR lines into microword register 310 (line 1611). Thus, microinstruction 101 occupies the microword register, and is the currently executing instruction, during cycle 2. The value "101 38 is transferred from PC MUX 305 on signal lines PCADR00 through PCADR11 into PC 301 for use in the fetches that will take place during cycle 2.

Since Table 1 assumes that microinstruction 101 includes a conditional branch to 200 that is to be taken, microinstruction 200 will occupy the microword register during cycle 3.

Similarly to cycle 1, the next sequential control store location (location 102, the address being obtained by taking the value 101 from PC 301 and incrementing it to 102 in PC +1 adder 303) is accessed during the first 70 ns of cycle 2 (line 1603) and microinstruction 102 is available at the control store outputs (line 1607) in time to be gated by LAST70CLK into the prefetch register (line 1608). The incremented address 102 is stored in PC 301. Control store location 200 (the target address obtained from microinstruction 101) is accessed the second 70 ns of cycle 2 (line 1603), and branch target microinstruction 200 is available at the control store outputs and prefetch buffer inputs late in cycle 2 (line 1607). The value 200 is stored in branch latch 314. ALU 312, having determined that this branch is to be taken, will raise the signal TESTPASSED (line 1606). Referring to FIGS. 13A and 13B, TESTPASSED inhibits gating next sequential microinstruction 102 from the prefetch register onto the SELUIR lines (line 1609); with reference to FIG. 14, TESTPASSED enables gating branch target microinstruction 200 through the prefetch buffer onto the SELUIR lines. At time 280 ns, UIRCLK transits to TRUE (line 1605). Referring to FIGS. 15A and 15B, this clocks branch target microinstruction 200 from the SELUIR Lines into microword register 310. Thus, branch target microinstruction 200 is executed during cycle 3.

During the first half of cycle 3, microinstruction 201 is to be prefetched (line 1607). Since the currently executing microinstruction (200) was reached because it was a branch target, PC 301 will not come into play; the value 200 is stored in branch latch 314, and branch +1 adder 304 increments to the required address of 201.

During the last half of cycle 3, executing microinstruction 200 specifies 500 as its target address, and microinstruction 500 is prefetched. One of the two will be selected to execute during cycle 4, not discussed herein.

Now follows a discussion of stack 315 and stack pointer 316.

A prior art scheme for addressing a stack is shown in FIG. 17. Stack 1703 is a memory device with some number of memory locations, here four. Stack pointer 1701 is a flip flop register for containing the address of the location in stack 1703 which it is desired to access. Increment/decrement means 1705 can add or subtract by one the contents of stack pointer 1701. (Since stack locations are addressed in sequence, no provision is needed to load stack pointer 1701 with arbitrary contents, as would be the case for a random access memory.) Stack pointer 1701 must be able to contain as many values as there are locations in stack 1703. Since stack 1703 has four locations, the two bit positions of stack pointer 1701 can be incremented through the four combinations 00, 01, 10, and 11.

In order to select a particular one of the four locations in stack 1703 it is typically necessary to enable an "address selection line" by decoding the contents of stack pointer 1701. Decoder 1702 comprise combinatorial gating to recognize each of the possible contents of stack pointer 1701 and enables the corresponding one of the four address selection lines 1706, which results in transferring data between the corresponding location of stack 1703 and bus 1704. (Operation of storage devices is well known in the literature and will not be discussed herein.)

Additional gating may be incorporated in decoder 1702 in order to detect "overflow" and "underflow". (By convention, a stack is said to overflow when an attempt is made to exceed the capacity of the stack; it is said to underflow when an attempt is made to retrieve data from a stack when no data has previously been stored in it.)

FIG. 18 presents an overview of the stack addressing scheme of the present invention. Stack 315 contains four twelve-bit locations, each of which is enabled by one of the address selection lines 1802. Each of address selection lines 1802 is the output of a stage of stack pointer 316, which is not, as in the prior art, an increment-/decrement register, but is a shift register. Stack pointer 316 must contain at least as many stages as there are locations in stack 315. (In the present embodiment, the number of stages in stack pointer 316 is two greater than the number of locations in stack 315. As will be discussed below, the two additional stages aid in detecting overflow.) Stack pointer 316 is initially loaded with one 1 bit in its rightmost stage (stage 5) and is filled out with 0 bits. The 1 bit is shifted left after each stack write, and shifted right after each stack read. The stage containing the 1 bit at a given time has its output in the TRUE state; since the output lines of stack pointer 316 are in fact the address selection lines 1802, the correct address selection line is TRUE without the necessity for any of the gating or decoding which the prior art schemes require. Since many applications require stacks to operate quickly, it is an advantage that the delays associated with gating are eliminated. While the shifting of the bit is left to right as described above, this can be reversed and still result in utilizing the invention described herein.

The present embodiment uses stack 315 for only one purpose—storing the addresses of microinstructions following call microinstructions for subsequent use by return microinstructions. If, for example, microinstruction 700 is a call microinstruction that invokes a subroutine, the addres 701 (derived, as previously discussed, by incrementing the 700 in PC +1 adder 303, passing it through PC MUX 305 onto the PCADR00 through PCADR11 lines and loading it into PC 301) is output from PC 301 and stored on the top of the stack. When the subroutine executes a return microinstruction, the address 701 is retrieved from the top of the stack and input to branch MUX 302 as the next microinstruction address. Execution thus returns to the microinstruction following the call microinstruction.

In the present embodiment, the contents of PC 301 are written to the next available stack location every microinstruction cycle. However, stack pointer 316 is shifted to the left only if the current microinstruction is a conditional call microinstruction and if the specified conditions are met. Therefore, only the PC 301 contents which are in fact the return addresses of call microinstructions that cause branching are retained in the stack—for all other microinstructions, failing to shift stack pointer 316 results in keeping the same stack 315 location selected, and the contents will be overwritten during the next microinstruction cycle.

As has been discussed, stack pointer 316 is initially set to all zero bits except for a 1 bit in stage 5. The 1 bit in stage 5 selects location 3. When locations 3 is written into on a call microinstruction, the stack pointer 316 is shifted one stage to the left after writing so that the 1 bit is in stage 4, selecting location 2. Three more call microinstructions would result in filling locations 2, 1, and 0, shifting the one bit to stages 3, 2, and 1 respectively, at which point the stack would be full. Another attempt to store a return address in stack 315 shifts the one bit to stage 0. Nothing is actually written to the stack, there being no stack location associated with stage 1 of stack pointer 316. This constitutes overflow, but the present embodiment does not detect overflow until an attempt is made to retrieve the data that could not be written. The next attempt to read from stack 315 (an attempt to read back the data that could not be written) produces the OVERFLOW signal from gate 1803.

When the stack is empty (whether because nothing has ever been written in it or because everything written in it has been read back) the 1 bit will be in stage 5 of stack pointer 316. An attempt to read the stack at that time will not shift stack pointer 316, but will produce the UNDERFLOW signal from gate 1804.

FIGS. 19A and 19B show the logic diagram of stack pointer 316. It comprises six D flip-flops. (A D flip-flop captures and stores the state of the D (data) input at the time the CLK input transits to a logic high.) Stage 9 is depicted at the top (element 1903) (conventionally called the "left") and stage 5 (associated with the first location in stack 315) at the bottom (element 1904) (conventionally called the "right"). Gating group 1901 is enabled by the BR TYP bits of the currently executing microinstruction being equal to 01, specifying a conditional call microinstruction, and by the TSTCND0 signal indicating that the requisite conditions are met, to produce the C STKC signal, indicating that a call microinstruction is to be performed. Similarly, BR TYP bits being equal to 11 and TSTCND0 produce signal R STKC from gating group 1902 indicating that a return microinstruction is to be performed.

On a call microinstruction, C STKC shifts stack pointer 316 to lower numbered stages (by convention, "to the left"), denoting subsequent stack locations. For example, gate 1905 is enabled by C STKC and STKC3 (the state of stage 3) and gates that state into stage 2.

Similarly, on a return microinstruction, R STKC shifts stack pointer 316 to higher numbered stages ("to the right"). Gate 1906, for example, shifts the state of stage 2 into stage 3.

STKC2, STKC3, STKC4, and STKC5 (the outputs of stages 2 through 5 respectively) are passed through 2:1 MUX 1907, enabled by the RESTORE signal, onto STK 0, STKW 1, STKW 2, and STKW 3 respectively, which are address selection lines 1802.

The circuitry implementing stack 315 is shown in FIGS. 20A, 20B and 20C. Each of the four locations is constructed of six dual D flip-flops. (A dual D flip-flop combines two D flip-flops in a package.) For example, element 2011 stores bits 0 and 1 of location 0, pins 1 and 3 being the inputs for bits 0 and 1 respectively, and pins 7 and 9 being the outputs for bits 0 and 1 respectively. Element 2011 requires STKW 0 of address select lines 1802 on pin 4, since it is part of location 0. Each of the four locations 2001, 2002, 2003, and 2004 is enabled by STKW 0, STKW 1, STKW 2, and STKW 3 respectively.

Stack 315 is used to store the contents of PC 301, as discussed previously. The outputs of PC 301, namely PCR00 through PCR11, are passed through 2:1 MUX's 2012, 2013, and 2014 under control of the RESTORE signal onto the STKI00 through STKI11 lines, which are input in parallel to each of the four stack locations; they are stored in the one location currently enabled by address selection lines 1802, as described above.

Note that the contents of PC 301 are stored in stack 315 every microinstruction cycle; however, stack pointer 316 is not shifted left except when call microinstructions are executed, as described above. Therefore, information written into stack 315 is not saved except for call microinstructions; if stack pointer 316 is not shifted, data written into a stack location during a microinstruction cycle will be overwritten the next microinstruction cycle.

FIGS. 21A, 21B, and 21C depict logic circuits for generating signals required by branch MUX 302 and branch address forwarding circuit 313 to for implementing return microinstructions. Gates 2101, 2102, 2103, and 2104 are enabled by the BR TYP bits of the currently executing microinstruction being equal to 11, denoting a return microinstruction. Each is enabled by one of the stages of shift register 316, denoting a location in stack 315 as previously discussed.

For example, gate 2103 is enabled by STKC3, meaning that stack location location 1 is presently selected to be written into. This in turn means that stack location 2 is the last stack location with a return address stored in it. Gate 2103 therefore produces the signal STK2 BR, denoting that the address contained in stack location 2 is now to be used as a branch target address.

Branching to the location whose address is contained in stack location 2 is initiated by branch MUX 302 (FIGS. 5 and 6). Using bit 02 as an example, and referring to FIG. 5, gate 502 is enabled by STK2 BR (just discussed) and passes STK 02, which reference to FIG. 20 discloses to be bit 02 of stack location 2. Logic group 501 then outputs BRADR02. Similarly, the other eleven logic groups depicted in FIGS. 5 and 6, together with group 501, output the 12-bit address BRADR00 through BRADR11, which results in branching to that address, as was previously discussed.

In the event of errors in microcode resulting in stack overflow or stack underflow, the address produced by branch MUX 302 as just described is indeterminate, and attempts to branch to such an indeterminate address will produce indeterminate results. In such cases, computers generally "trap", i.e., force microinstruction execution to the start of a sequence that directs the machine to recover from the error in as orderly a manner as possible. By design convention, the current embodiment traps to the microinstruction at control store 307 location I if stack overflow is detected, and to the microinstruction in location 2 in the event that underflow is detected. There now follows a discussion of how these traps are implemented.

Overflow is detected by gate 1803, show in detail on FIG. 21B. BR TYP bits equal to 11, indicating a return microinstruction, and STKC0, indicating a prior attempt to write beyond available locations in stack 315, as previously described, produce the signal STKOVFL denoting overflow. Gate 1804, responsive to BR TYP bits specifying a return microinstruction, and STKC5, indicating that the stack is empty as previously discussed, produce the signal STKUNFL denoting underflow. Either of these signals causes gate 2105 to produce the STKERR signal.

Refer now to branch address forwarding circuit 313, FIG. 10. Reference to each of the gates 1001 through 1012 shows that in order for the address BRADR00 through BRADR11 to be passed to lines BRADDR00 through BRADDR11, STKERR, STKUNFL and STKOVFL must all be absent. If STKOVFL and STKERR are present, all twelve output bits will be zero except for BRADDR10, which will be a one because of STKUNFL enabling gate 1011. This bit pattern represents the requisite address of 2.

Likewise, if STKOVFL and STKERR are present, all twelve bits will be zero except for BRADDR11, which will be a one because STKOVFL enables gate 1012. This bit configuration represents the requisite address of 1.

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A storage system for use in a digital computer comprising:
   storage means having n multibit storage locations for storing data in binary form;
   shift register means having n stages for identifying locations in said storage means;
   connect means coupled between said storage means and said shift register means for identifying each of said n stages of said shift register means with a corresponding location in said storage means;
   selection means for selecting a next stage in said shift register means and for enabling a corresponding location in said storage means.

2. A last-in first-out digital data storage system responsive to read and write commands, comprising
   storage means comprising "n" multibit binary storage locations;
   a shift register comprising at least "n" stages and organized as having a left end and a right end;
   initiation means for loading a 1-bit into the rightmost stage of the shift register, and 0-bits into all other stages;
   selection means for associating each of the multibit binary storage locations with a different one of the rightmost "n" stages of the shift register;
   data input lines for conducting multibit binary data to the storage means;
   data output lines for conducting multibit binary data from the storage means means responsive to the write command for storing data provided on the data input lines in the location associated with the shift register stage containing a 1-bit, and then for shifting the shift register contents one stage to the left while filling with a 0-bit on the right end; and means responsive to the read command for shifting the shift register one stage to the right, for retrieving the data contained in the location associated with the shift register stage containing a 1-bit, and for providing that data on the data output lines.

3. The data storage system recited in claim 2, further comprising means responsive to a 1-bit in the rightmost stage of the shift register and to the read command for indicating an underflow condition.

4. The data storage system recited in claim 3, wherein the shift register comprises "n+2" stages, and further comprising means responsive to a 1-bit in the leftmost stage of the shift register and to the read command for indicating an overflow condition.

* * * * *